United States Patent [19]

Yokota

[11] Patent Number: 5,413,900
[45] Date of Patent: May 9, 1995

[54] SILVER HALIDE PHOTOGRAPHIC MATERIAL AND A MANUFACTURING METHOD THEREFOR

[75] Inventor: Minoru Yokota, Kanagawa, Japan

[73] Assignee: Fuji Photo Film Co., Ltd., Kanagawa, Japan

[21] Appl. No.: 181,411

[22] Filed: Jan. 14, 1994

[30] Foreign Application Priority Data

Jan. 18, 1993 [JP] Japan .................................. 5-005822
Jan. 19, 1993 [JP] Japan .................................. 5-006785

[51] Int. Cl.6 ........................ G03C 1/76; G11B 5/845; G11B 5/852
[52] U.S. Cl. ................................. 430/495; 430/496; 430/501; 430/140; 430/523; 430/935; 430/531; 430/533; 427/130; 428/694 BA
[58] Field of Search ............... 430/496, 501, 140, 523, 430/495, 531, 533; 427/130; 428/694 BA

[56] References Cited

U.S. PATENT DOCUMENTS

| | | |
|---|---|---|
| 2,418,479 | 4/1947 | Pratt et al. . |
| 4,279,945 | 7/1981 | Audran et al. ...................... 430/140 |
| 4,447,467 | 5/1984 | Oguchi et al. . |
| 4,672,009 | 6/1987 | Takahashi . |
| 5,147,768 | 9/1992 | Sakakibara .......................... 430/501 |
| 5,254,449 | 10/1993 | James et al. ...................... 430/140 |

FOREIGN PATENT DOCUMENTS 62-175931 8/1987 Japan .

*Primary Examiner*—Richard L. Schilling
*Assistant Examiner*—Mark F. Huff
*Attorney, Agent, or Firm*—Sughrue, Mion, Zinn, Macpeak & Seas

[57] ABSTRACT

A manufacturing process for a light-sensitive material having thereon a magnetic recording layer, the magnetic recording layer having excellent optical transparency, a high magnetic recording performance (S/N ratio) and good graininess. After applying a coating solution on a support, the coating solution containing a magnetic substance, the support is dried while it is passed through an orienting magnetic field to orient the magnetic substance contained in the coating solution in a fixed direction.

13 Claims, No Drawings

SILVER HALIDE PHOTOGRAPHIC MATERIAL AND A MANUFACTURING METHOD THEREFOR

FIELD OF THE INVENTION

The present invention relates to a silver halide photographic material including a transparent magnetic recording layer.

BACKGROUND OF THE INVENTION

In the past, it was almost impossible to input various information (for example, photographing date, weather, magnification ratio, and printed sheet number) into a silver halide photographic light-sensitive material (hereinafter abbreviated to a light-sensitive material) when photographing with a camera, and it was only possible to optically input a photographing date.

Also when printing on photographic material, inputting information regarding the light-sensitive material itself is entirely impossible and has become a large obstacle to rapid processing and cost reduction.

Inputting various information into light-sensitive material will be a very important means for improving and simplifying the operation of a camera in the future. Magnetic recording is important as an information input means therefor in terms of capability of arbitrary input and output and inexpensiveness, and therefore the use of magnetic recording for this purpose has been investigated.

Magnetic recording layers and the input and output process therefor make it possible to incorporate various information into a light-sensitive material, which was difficult in the past. It has become possible to input and output into the magnetic recording layer, for example, the photographing date; the weather conditions; the illumination conditions; the photographing conditions, such as minification/magnification ratio; the reprinted seat number; a film portion, if any, which must be zoomed; a message; and printing conditions. Further, it may be possible to utilize such layer as signal input/output means used when information is input directly into a TV/video image to form an image.

U.S. Pat. Nos. 3,782,947, 4,279,945, and 4,302,523 describe a magnetic recording layer having a transparency necessary for a light-sensitive material during photographing, the magnetic recording layer being provided on the backside of the light-sensitive material which includes a transparent support. These magnetic recording layers operate based upon pertinent selection of the amount and size of a magnetic substance contained in the magnetic layer. Further, a system for signal input into this magnetic recording layer is disclosed in International Patent Publications 90-4205 and 90-04212.

These patents were the origin which promoted research directed to improving the transparency and magnetic recording performance (i.e., S/N ratio) of a magnetic recording layer. It has been discovered that the classification of particle of magnetic substances into a desired size by a dispersing method, can provide a light-sensitive material which is transparent and has a high S/N ratio. This is described in JP-A-5-88283.

In recent years, however, it has been discovered that the transparency which can be achieved by the patents described above is limited and in applications such as, for example, reversal film (a positive film), a large color density originated in the magnetic substance contained in the magnetic recording layer causing a problem.

Further, the graininess of an emulsion used in light-sensitive material has been improved in recent years. However, a new problem has been created in that the graininess obtained by the methods of the above patents deteriorates the graininess of the emulsion which has been improved at a great cost. This is due to the presence of the magnetic recording layer.

In order to obtain an optically transparent magnetic recording layer having a high S/N ratio and which has good graininess, a manufacturing process by which the orientation of the magnetic substance is increased is required.

SUMMARY OF THE INVENTION

An object of the present invention is to provide a light-sensitive material including a magnetic recording layer having excellent optical transparency, high magnetic recording performance (S/N ratio) and good graininess, and a manufacturing process therefor.

The foregoing object and other objects of the present invention have been achieved by a manufacturing process for a photographic light-sensitive material having a silver halide emulsion layer on at least one side of a support therefor, and an optically transparent magnetic recording layer, wherein after applying a coating solution (in which a magnetic substance is dispersed) on the support, the support is dried while it is passed through an orienting magnetic field to orient the magnetic substance contained in the costing solution in a fixed direction.

A silver halide photographic light-sensitive material is also provided by the present invention, the material having a silver halide emulsion layer on at least one side of a support therefor, wherein the photographic light-sensitive material has at least one magnetic recording layer; the magnetic layer has the maximum optical density value (Dmax) of 0.3 or less; and the magnetic substance in the magnetic recording layer has an orientation degree of 0.75 or more.

DETAILED DESCRIPTION OF THE INVENTION

The present invention will be explained below in detail.

The orientation degree (sometimes referred to as squareness ratio) of the magnetic substance in the magnetic recording layer of the present invention will be described. The orientation degree of the magnetic substance is equivalent to the orientation degree which has so far been defined in the magnetic tape fields and others. In particular, it represents the degree to which the magnetic particles are aligned in the longitudinal direction of a base (i.e., support). It is defined-based upon an orientation degree of 1.00 when the magnetic particles are completely aligned in the longitudinal direction of the base. The measurement of the orientation degree can be conducted, for example, using a vibrating sample magnetometer (VSM) manufactured by Toei Kogyo Co., Ltd.

Any suitable conventional method for increasing the orientation degree of a magnetic substance may be used in the present application. See, for example, the processes described in JP-A-52-141612 (the term "JP-A" as used herein means an unexamined published Japanese patent application) and JP-A-62-175931.

Next, the graininess of the light-sensitive material of the present invention will be described. The graininess in the present invention is defined by a RMS value obtained by carrying out a microdensito measurement at an aperture size of 80 μm using a light source which is a specular light. The larger the graininess value, the worse the graininess is, as observed on a photograph.

In the present invention, it has been discovered that the alignment of the particles of a magnetic substance obtained by the increase in the orientation degree of the magnetic substance improves the graininess. The orientation degree of the magnetic substance is preferably from 0.75 to 1.00, particularly preferably 0.80 or more. Orienting to an orientation degree of 0.75 or more markedly improves the graininess.

An orientation magnetic field preferred in the present invention for orienting a magnetic substance will be described.

Any suitable method using a permanent magnet or a solenoid coil can be used for generating an orientation magnetic field in the present invention.

If a permanent magnet is used, the magnet may be located at only one side of a support on which a magnetic substance dispersing solution is coated, or may be located on both sides of the support by oppositely disposing a permanent magnet of the same pole. The latter is preferred in terms of an orientation efficiency.

It is not required that the magnets be located only at one site with respect to the magnetic substance-coated support, such as in the middle of the drying step, but rather may be disposed at several sites or more.

Preferably, the strength of the permanent magnet is 2000 Oe or more, more preferably 3000 Oe or more.

If a solenoid magnet is used, a magnetic field of 500 Oe or more may be utilized since a magnetic field having a long distance is readily formed unlike with a permanent magnet.

Preferably, the magnetic field used in the present invention is arranged inside of a zone at which a magnetic substance dispersing solution coated on the support is dried. The magnetic field may be applied after coating the magnetic substance dispersing solution onto the support without drying. This will achieve as well the increase in the orientation degree of the magnetic substance. In this case, however, agglomeration may take place simultaneously with the orientation of the magnetic substance (or before that) and as a result the graininess of a photo obtained therewith may be deteriorated.

In order to increase the orientation without agglomerating the magnetic substance, passing the support having the magnetic substance coated thereon through a magnetic field in the middle of the drying step is important. Preferably, the coated support is passed through the magnetic field at a point where the residual solvent in the magnetic recording layer is at a level of 5% to 70%. The magnetic recording layer may have any suitable residual solvent level at the end of the magnetic orientation. Preferably, the residual solvent is reduced to 5% or less, and the residual solvent may be completely dried in the magnetic field.

The term "residual solvent", as used in the present invention, is calculated based on the whole solvent amount contained in a coating solution coated per a unit area on the support, which is 100%.

The passing time necessary for the magnetic field orientation treatment depends on the strength of the magnetic field applied, but the minimum passing time is about 0.1 second. The distance between the magnet and the support depends on the strength of the magnet, but, in the case where a permanent magnet is used, the distance is generally from 5 mm to 200 mm.

Next, the transparent magnetic recording layer used in the present invention will be described.

Any suitable magnetic substance may be used in the transparent magnetic recording layer according to the present invention including, for example, ferromagnetic γ-iron oxide fine powder, Co-containing ferromagnetic γ-iron oxide fine powder, ferromagnetic magnetite fine powder, Co-containing ferromagnetic magnetite fine powder, ferromagnetic chromium dioxide fine powder, ferromagnetic alloy powder, and barium ferrite powder. Other suitable magnetic substances will be apparent to one skilled in the art.

The ferromagnetic alloy powder may be, for example, an alloy in which a metal component is 75 wt% or more and 80 wt% or more of the metal component is at least one kind of ferromagnetic metal or alloy, such as, Fe, Co, Ni, Fe-Co, Fe-Ni, Co-Ni and Co-Fe-Ni, and which contain other components, such as Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te and Bi, in an amount of 20 wt% or less based on the metal compounds. The above ferromagnetic metal components may contain a small amount of water, hydroxide or oxide.

Processes for manufacturing these magnetic substances are known, and the magnetic substances used in the present invention can be manufactured according to those known processes.

Any suitable form and size of the magnetic substance may be used in the present invention. Preferably, the magnetic substance in the transparent magnetic recording layer is present in a needle-shaped form, a rice-shaped form, or a form which is spherical, cubic, or tabular. More preferably, the magnetic substance is present in a form which is either a needle-shaped form or a rice-shaped form because of a marked effect obtained by magnetic field orientation of those forms. Any suitable crystallite size and specific surface area may be used also. The specific surface area is preferably 20 m²/g or more in terms of SBET (specific surface area obtained by a BET adsorption insotherm), more preferably 30 m²/g or more from the viewpoint of graininess. The magnetic substance can have any suitable pH and may be surface treated if desired. Surface treatment may be carried out using a substance containing, for example, titanium, silicon and aluminum. If ferromagnetic iron oxide fine powder is used in the present invention, any suitable ratio of divalent iron/trivalent iron can be used.

Next, the meaning of the term "transparency" in the context of the present invention will be described. By the term "transparency", as used in the present invention, is meant the case where the maximum value (Dmax) of optical density in the magnetic recording layer is 0.3 or less. By the term "optical density", as used in the present invention, is meant the optical densities $D^B$, $D^G$, and $D^R$ measured with an X light densitometer in a status A mode through the filters B, G and R, respectively. The maximum optical density of these is defined as Dmax.

Dmax of the optical density in the magnetic recording layer in the present invention is 0.3 or less, preferably 0.10 or less, and more preferably 0.05 or less, with the preferred lower limit being 0.001. A low Dmax is preferred in view of the influence of the same on a photographic image.

Any suitable amount of magnetic substance per square meter of a transparent magnetic recording layer may be used in the present invention, as long as the above optical transparency is maintained. Preferably, the amount of magnetic substance is as much as possible in order to increase the S/N ratio, and preferably is 0.01 to 1 g/m$^2$.

Next, a binder for use in the magnetic recording layer of the present invention will be described.

Any suitable binder may be used in the magnetic recording layer of the present invention, including, for example, the known thermoplastic resins, thermosetting resins, irradiation-curing resins, reactive-type resins, and the mixtures thereof, which are conventionally used for a magnetic recording medium.

Examples of the thermoplastic resins include: vinyl series copolymers, such as vinyl chloride-vinyl acetate copolymers, copolymers of vinyl chloride and vinyl acetate with vinyl alcohol, maleic acid and/or acrylic acid, vinyl chloride-vinylidene chloride copolymers, vinyl chloride-acrylonitrile copolymers, and ethylene-vinyl acetate copolymers; cellulose derivatives, such as nitrocellulose, diacetyl cellulose, triacetyl cellulose, cellulose acetate propionate, and cellulose acetate butylate resins; rubber series resins such as acryl resins, polyvinylacetal resins, polyvinylbutyral resins, a polyester polyurethane resins, polyether polyurethane resins, polycarbonate polyurethane resins, polyester resins, polyether resins, polyamide resins, amino resins, styrene-butadiene resins, and butadiene-acrylonitrile resins; silicon series resins; and fluorine series resins.

Suitable hydrophilic binders are described in *Research Disclosure* No. 17643, p. 26, and No. 18716, p. 651, and include, for example, water soluble polymers, cellulose esters, latex polymers, and water soluble polyesters. The water soluble polymer include, for example, gelatin, gelatin derivatives, casein, agar, sodium alginate, starch, polyvinyl alcohol, a polyacrylic acid copolymer, and a maleic anhydride copolymer. Cellulose esters include, for example, carboxy methyl cellulose and hydroxyethyl cellulose. The latex polymers include, for example, vinyl chloride-containing copolymers, vinylidene anhydride-containing copolymers, acrylate-containing copolymers, vinyl acetate-containing copolymers, and butadiene-containing copolymers. Among them, more preferred is gelatin. Further, a gelatin derivative may be used in combination with gelatin.

The gelatin may be of lime-treated gelatin, acid-treated gelatin, enzyme-treated gelatin, a gelatin derivative, and a modified gelatin. Of the foregoing, lime-treated gelatin and acid-treated gelatin are preferably used.

If gelatin is contained in the magnetic recording layer, the layer is preferably hardened. Any suitable hardener may be used including, for example, aldehyde series compounds, such as formaldehyde and glutaraldehyde; ketone compounds, such as diacetyl and cyclopentanedione; compounds having a reactive halogen, such as bis(2-chloroethylurea), 2-hydroxy-4,6-dichloro-1,3,5-triazine, and in addition thereto, those described in U.S. Pat. Nos. 3,288,775 and 2,732,303, the disclosures of which are herein incorporated by reference, and British Patents 974,723 and 1,167,207; compounds having a reactive olefin, such as divinylsulfone, 5-acetyl-1,3-diacryloylhexahydro-1,3,5-triazine, and in addition thereto, those described in U.S. Pat. Nos. 3,635,718 and 5,232,763, the disclosures of which are herein incorporated by reference, and British Patent 994,869; N-methylol compounds, such as N-hydroxymethyl phthalimide, and in addition thereto, those described in U.S. Pat. Nos. 2,732,316 and 2,586,168, the disclosures of which are herein incorporated by reference; isocyanates as described in U.S. Pat. No. 3,103,437, the disclosure(s) of which is herein incorporated by reference; aziridine compounds as described in U.S. Pat. Nos. 3,017,280 and 2,983,611, the disclosure(s) of which is herein incorporated by reference; acid derivatives as described in U.S. Pat. Nos. 2,725,294 and 2,725,295, the disclosure(s) of which is herein incorporated by reference; epoxy compounds as described in U.S. Pat. No. 3,091,537, the disclosure(s) of which is herein incorporated by reference; and halogenated carboxylaldehydes, such as mucochloric acid. The hardener may be, for example, an inorganic compound, chrome alum, zirconium sulfate, and a carboxyl group activated-type hardener as described in JP-B-56-12853 (the term "JP-B" as used herein means an examined Japanese patent publication) and JP-B-58-32699, Belgian Patent 825,726, JP-A-60-225148, JP-A-51-126125, JP-B-58-50699, JP-A-52-54427, and U.S. Pat. No. 3,321,313, the disclosure(s) of which is herein incorporated by reference.

Other suitable binders will be apparent to one skilled in the art.

The amount of the hardener used is preferably 0.01 to 30 weight %, more preferably 0.05 to 20 weight % based on the amount of dry gelatin.

The ratio of magnetic substance to binder in a magnetic recording layer of the present invention preferably is in the range of 100 to 3000 weight parts of binder per 100 weight parts of the magnetic substance, in terms of a weight ratio. Low binder levels reduces dispersibility and a durability, while an excessive amount of binder is not preferred since it reduces the filling degree of the magnetic layer.

The magnetic recording layer according to the present invention may further contain known lubricants, abrasives, matting agents, and anti-static agents.

In the present invention, anyone of the binders described above can be used. Diacetyl cellulose, triacetyl cellulose, and gelatin are preferred from the viewpoint of dispersibility and transparency.

The thickness of the magnetic recording layer in the present invention is preferably 0.1 to 10 μm, more preferably 0.2 to 5 μm, and more preferably 0.3 to 3 μm.

The magnetic recording layer of the present invention may be provided on the same side of the light-sensitive material as a silver halide emulsion layer, or may be provided on the opposite side. Preferably it is located on the opposite side to the side having the silver halide emulsion layer.

Any suitable method may be used to apply the magnetic recording layer of the present invention to the support including, for example, coating, printing, evaporating, heat fusing, heat transferring, and tape adhering methods. Further, a polymer solution in which a magnetic substance is dispersed and a polymer solution for preparing a support may be flowed and spread together to prepare a support having thereon the magnetic recording layer. In this case, the polymer for dispersing the magnetic substance is preferably substantially the same as the polymer for preparing the support. In forming the magnetic recording layer, a magnetic field orientation treatment is preferably provided, as discussed above.

Suitable coating methods for providing the magnetic layer include, for example, doctor coating, extrusion coating, slide coating, roller coating and gravure coating. Methods for preparing a magnetic substance dispersing solution are known, and the magnetic recording layer of the present invention can be formed using the dispersing solutions prepared by these methods.

Any suitable support for the light-sensitive material may be used in the present invention including, for example, various plastic films. Preferably, the support is a cellulose derivative (for example, diacetyl-, triacetyl-, propionyl-, butanoyl-, and acetylpropionylacetates), polyamide, polycarbonate as described in U.S. Pat. No. 3,023,101, the disclosure(s) of which is herein incorporated by reference, polyester as described in JP-B48-40414 (for example, polyethylene terephthalate, poly-1,4-cyclohexanedimethylene terephthalate, polyethylene 1,2-diphenoxyethane-4,4'-dicarboxylate, polybutylene terephthalate, and polyethylene naphthalate), polystyrene, polypropylene, polyethylene, polymethylpentene, polysulfon, polyethersulfon, polyallylate, and polyetherimide. More preferably, the support is triacetyl acetate, polyethylene terephthalate or polyethylene naphthalate. Other suitable support materials will be apparent to one skilled in the art.

A plasticizer may be included in the support for the purpose of softening the support. Suitable plasticizers which may be used in the support comprising cellulose ester include compounds containing a plasticizer, such as triphenyl phosphate, biphenyl diphenyl phosphate, and dimethyl ethyl phosphate. Other suitable plasticizers will be apparent to one skilled in the art.

The support may be in the form, depending upon the kind of polymer used therein, of a sheet having a thickness of about 1 mm to a thin layer film with a thickness of about 20 $\mu$m according to particular application. Preferably, the thickness of the support is within the range of 50 to 300 $\mu$m.

The support may contain a dye for the purposes of neutralizing a base color, preventing light piping, and preventing halation.

In order to firmly adhere the photographic layers (for example, a light-sensitive silver halide emulsion layer, an intermediate layer, a filter layer, a magnetic recording layer, and a conductive layer) on the support, the support may be subjected to a surface activation treatment, such as a chemical treatment, a mechanical treatment, a corona discharge treatment, a flame treatment, a UV treatment, a high frequency treatment, a glow discharge treatment, an active plasma treatment, a laser treatment, a mixed acid treatment, or an ozone oxidation treatment. A photographic emulsion may be directly coated onto the surface treated support. Alternatively, after a surface treatment is carried out or without performing a surface treatment, a subbing layer may be provided on the support to coat thereon a photographic emulsion layer.

The hardeners described above can be used as a gelatin hardener for the subbing layer.

Various additives can be incorporated into a subbing layer solution according to necessity. These additives include, for example, surface active agents, anti-static agents, anti-halation agents, dyes for coloring, pigments, coating aids, and anti-fogging agents. When the subbing layer solution is used, an etching agent, such as resorcin, chloral hydrate, and chlorophenol can be incorporated as well into the subbing layer solution.

Any suitable method may be used to coat the subbing layer solution including, for example, a dip coating method, an air knife coating method, a curtain coating method, a roller coating method, a wire bar coating method, a gravure coating method, or an extrusion coating method as described in U.S. Pat. No. 2,681,294, the disclosure(s) of which is herein incorporated by reference, in which a hopper is used. Two or more layers can simultaneously be coated, if desired, as described in U.S. Pat. Nos. 2,761,791, 3,508,947, 2,941,898, and 3,526,528, the disclosure(s) of which is herein incorporated by reference, and "Coating Technology" written by Y. Harazaki, p. 253 (published by Asakura Book in 1973).

The light-sensitive material of the present invention includes a support, a silver halide emulsion layer, and a magnetic recording layer. The light-sensitive material further may include a backing layer, a protective layer, an intermediate layer, and an anti-halation layer. These layers other than a magnetic recording layer and a back layer are primarily hydrophilic colloid layers, and the magnetic recording layer and the back layer also may be a hydrophilic colloid layer.

Suitable binders for these hydrophilic colloid layers include, for example, protein, such as gelatin, colloidal albumin, and casein; cellulose compounds, such as carboxymethyl cellulose and hydroxyethyl cellulose; sugar derivatives, such as agar, sodium alginate, and starch derivatives; and synthetic hydrophilic colloids, including, for example, polyvinyl alcohol, poly-N-vinylpyrrolidone, polyacrylic acid copolymer, polyacrylamide or the derivatives and partial hydrolysis products thereof, dextran, polyvinylacetate, polyacrylate, and rosin. Other suitable binders will be apparent to one skilled in the art. A mixture of two or more of these colloids may be used, if desired.

Of the foregoing, gelatin is preferred, and more preferred, the gelatin is so-called lime-treated gelatin, acid-treated gelatin, and enzyme-treated gelatin.

The silver halide emulsion layer, and the other hydrophilic colloid layers in the photographic light-sensitive material of the present invention, can be hardened by various organic or inorganic hardeners which may be used above or in combination.

Preferably, the silver halide color photographic light-sensitive material used in the present invention is a color reversal film or a color negative film.

The present invention will be further explained below in connection with a color reversal film for general use.

The light-sensitive material of the present invention may be provided on a support with one or more of the silver halide emulsion layers including a blue-sensitive layer, a green-sensitive layer and a red-sensitive layer. Any suitable number and order of the silver halide emulsion layers and non-light-sensitive layers may be used in the present invention. For example, the silver halide photographic light-sensitive material may include a support, one or more light-sensitive layers including a plurality of silver halide emulsion layers having about the same spectral sensitivity, but different light sensitivities. The light-sensitive layer may be a unit light-sensitive layer having spectral sensitivity to any of blue light, green light and red light. In a multilayer silver halide color photographic light-sensitive material, the unit light-sensitive layer is usually provided in the order of a red-sensitive layer, a green-sensitive layer and a blue-sensitive layer from the support side. According to the desired purpose for the light-sensitive material, however, the above order may be varied, or the layers may be arranged in an order wherein a layer having a different light sensitivity is interposed between layers having the same light sensitivity.

Various non-light-sensitive layers, such as an intermediate layer, may be provided between the above described silver halide light-sensitive layers and the uppermost layer or lowest layer.

The intermediate layer may contain couplers and DIR compounds as described in JP-A-61-43748, JP-A-59-113438, JP-A-59-113440, JP-A-61-20037, and JP-A-61-20038 and may further contain an anti-color mixing agent, as is conventional.

Preferably, a two layer structure including a high-sensitivity emulsion layer and a low-sensitivity emulsion layer, is used in the plural silver halide emulsion layers constituting the respective unit light-sensitive layers, as described in German Patent 1,121,470 or British Patent 923,045. Preferably, these layers are provided in an arrangement so that the sensitivities become lower closer to the support. A non-light-sensitive layer may be provided between the respective silver halide emulsion layers in this embodiment. Further, a low sensitivity layer may be provided on the side of the non-light-sensitive layer farther from the support and a high sensitivity layer may be provided on the side closer to the support, as described in JP-A-57-112751, JP-A-62-200350, JP-A-62-206541, and JP-A-62-206543.

Examples of layer arrangements, from the side farthest from the support include, in the following order, a low blue-sensitive layer (BL)/a high blue-sensitive layer (BH)/a high green-sensitive layer (GH)/a low green-sensitive layer (GL)/a high red-sensitive layer (RH)/a low red-sensitive layer (RL), the order of BH/BL/GL/GH/RH/RL, or the order of BH/BL/GH/GL/RL/RH.

The layers can also be provided, from the side farthest from the support, in the order of a blue-sensitive layer/GH/RH/GL/RL, as described in JP-B-55-34932. The layers can also be provided, from the side farthest from the support, in the order of a blue-sensitive layer/GL/RL/GH/RH, as described in JP-A-56-25738 and JP-A-62-63936.

A three layer arrangement, the layers having different light sensitivities and being arranged whereby the sensitivities are lowered in order toward a support, may be used in the invention. In such an arrangement, the highest light-sensitive silver halide emulsion layer is provided on the uppermost side, a middle light-sensitive silver halide emulsion layer having a lower light sensitivity than that of the uppermost layer is provided in an intermediate position, and a light-sensitive silver halide emulsion layer having a further lower light sensitivity than that of the intermediate layer is provided on a lower side, as described in JP-B-49-15495. Also, in this embodiment, layers having the same light sensitivity may be provided in an order, from the side farthest from the support, of a middle light-sensitive emulsion layer/a highly light-sensitive emulsion layer/a low light-sensitive layer, as described in JP-A-59-202464.

In addition to the above, these layers may be provided in the order of a high sensitivity emulsion layer/a low sensitivity emulsion layer/a middle sensitivity emulsion layer, or the order of a low sensitivity emulsion layer/a middle sensitivity emulsion layer/a high sensitivity emulsion layer. Where a four layer arrangement may be used, the layer arrangement may be varied as mentioned above.

In order to improve color reproduction, a donor layer (CL) having a multilayer effect, which is different in spectral sensitivity distribution from the primary light-sensitive layers, such as a BL, a GL and a RL, is preferably provided adjacent to, or close to the primary light-sensitive layers, as described in U.S. Pat. Nos. 4,663,271, 4,705,744, and 4,707,436, the disclosure(s) of which is herein incorporated by reference, and JP-A-62-160448 and JP-A-63-89850.

As described above, various layer structures and arrangements can be utilized in the present invention according to the intended purpose or purposes of the respective light-sensitive materials.

Preferably, the silver halide contained in the light-sensitive material of the present invention is silver bromoiodide, silver chloroiodide or silver bromochloroiodide, each containing about 30 mole% or less of silver iodide. More preferably, the silver halide is silver bromoiodide or silver bromochloroiodide, each containing up to about 2 to about 10 mole% of silver iodide.

The silver halide grains contained in the photographic emulsion may be a regular crystal, such as a cube, octahedron or tetradecahedron, an irregular crystal, such as sphere or plate, a defective crystal, such as a twinned crystal, or a composite form thereof.

The silver halide may be fine grains having a size of about 0.2 $\mu$m or less, or large grains having a projected area-circle corresponding diameter of up to about 10 $\mu$m. The silver halide emulsion may be either polydispersed or monodispersed.

The silver halide photographic emulsion which can be used in the present invention can be prepared by the methods described in, for example, *Research Disclosure* (RD) No. 17643 (December 1978), pp. 22 to 23, "I. Emulsion Preparation and Types", No. 18716 (November 1979), p. 648, and No. 307105 (November 1989), pp. 863 to 865, "Chimie et Phisique Photographique" written by P. Glafkides, published by Paul Montel Co. (1967), "Photographic Emulsion Chemistry" written by G. F. Duffin, published by Focal Press Co. (1966), and "Making and Coating Photographic Emulsion" written by V. L. Zelikman et al, published by Focal Press Co. (1964).

Monodispersed emulsions suitable for use in the present invention are described in U.S. Pat. Nos. 3,574,628 and 3,655,394, the disclosure(s) of which is herein incorporated by reference, and British Patent 1,413,748.

Tabular grains having an aspect ratio of 3 or more can be used in the present invention. The tabular grains can readily be prepared by the methods described in "Photographic Science and Engineering" written by Gutoff, vol. 14, pp. 248 to 257 (1970), U.S. Pat. Nos. 4,434,226, 4,414,310, 4,433,048, and 4,439,520, the disclosure(s) of which is herein incorporated by reference, and British Patent No. 2,112,157.

The crystal structure of the grains may be uniform or of a structure in which a halogen composition is different in an inside and a surface thereof, or of a stratum structure. Further, silver halides of different compositions may be conjugated with an epitaxial conjunction. Also, the crystal structure may be of a structure in which silver halide is conjugated with compounds other than silver halide, for example, silver rhodanide and lead oxide. Further, a mixture of grains having different crystal forms may be used.

The emulsion suitable for a color reversal film may be of any of a surface latent image type, in which a latent image is formed primarily on the surface of a grain, an inner latent image type, in which the latent image is formed primarily in the inside of the grain, or a type in which the latent images are formed either on a surface or inside of the grain. The emulsion is required to be of a negative type. Of the emulsions of the inner latent image type, the emulsion may be a core/shell type inner latent image type emulsion as described in JP-A-63-264740. A method for preparing this core/shell inner latent image type emulsion is described in JP-A-59-133542. The thickness of the shell of this emulsion varies according to development processing, etc. Preferably, the thickness of the shell is 3 to 40 nm, more preferably 5 to 20 nm.

The silver halide emulsions used in the present invention may be subjected to physical ripening, chemical ripening and spectral sensitization before use. Suitable additives used in such processes are described in *Research Disclosure*, No. 17643, No. 18716 and No. 307105. Portions of these publications are summarized in the table below.

In the light-sensitive material of the present invention, different emulsions may be mixed and used in the same layer, the emulsions having different characteristic, such as different grain sizes, grain size distributions, halogen compositions, grain forms, and sensitivities.

Preferably, the light-sensitive silver halide emulsion used in the present invention and/or a substantially non-light-sensitive hydrophilic colloid layer used in the invention include silver halide grains the surfaces of which are fogged, as described in U.S. Pat. No. 4,082,553, the disclosure(s) of which is herein incorporated by reference, silver halide grains the insides of which are fogged, as described in U.S. Pat. No. 4,626,498, the disclosure(s) of which is herein incorporated by reference, and JP-A-59-214852, and colloidal silver. Silver halide grains the insides or surfaces of which are fogged are silver halide grains which can be uniformly (non-imagewise) developed regardless of an unexposed portion and an exposed portion in a light-sensitive material. Methods for preparing the silver halide grains the insides or surfaces of which are fogged are described in U.S. Pat. No. 4,626,498, the disclosure(s) of which is herein incorporated by reference, and JP-A-59-214852.

The silver halide of the inner nucleus of a core/shell type silver halide grain, the inside of which is fogged, may be either of the same halogen composition or a different halogen composition than the halogen composition of the shell. Either silver chloride, silver bromochloride, silver bromoiodide or silver bromochloroiodide can be used for the silver halide grains the insides or surfaces of which are fogged. Any suitable grain size of these fogged silver halide grains may be used in the present invention. The average grain size thereof is preferably 0.01 to 0.75 $\mu$m, more preferably 0.05 to 0.6 $\mu$m. Also, any suitable grain form may be used in the present invention. The grain form may be a regular grain form or a polydispersed emulsion. Preferably, the grain form is monodispersed, i.e., at least 95% by weight or by number of the silver halide grains have grain sizes within ±40% of an average grain size.

A non-light-sensitive fine grain silver halide is preferably used in the present invention. The non-light-sensitive fine grain silver halide is silver halide fine grains which are not sensitized in imagewise exposing for obtaining a dye image and substantially not developed in the development processing thereof, and they are preferably not fogged in advance. This fine grain silver halide preferably has a silver bromide content of 0 to 100 mole% and may contain silver chloride and/or silver iodide, if desired. Preferably, the fine grain silver halide silver iodide is in an amount of 0.5 to 10 mole%. Preferably, the fine grain silver halide has an average grain size of 0.01 to 0.5 $\mu$m, more preferably 0.02 to 0.2 $\mu$m, the average grain size being the average value of the diameter of a circle corresponding to the projected area of a grain. The fine grain silver halide can be prepared by the same method as that for preparing conventional light-sensitive silver halide. The surfaces of the fine grain silver halide grains do not need to be optically sensitized or spectrally sensitized, and, preferably, conventional stabilizers, such as the triazole series, azaindene series, benzothiazolium series and mercapto series compounds or a zinc compound are added thereto in advance before adding the emulsion to a coating solution. Colloidal silver is preferably incorporated into the layer containing the silver halide fine grain.

The amount of silver coated on the light-sensitive material of the present invention (including silver of the non-light-sensitive silver halide) is preferably 6.0 g/m$^2$ or less, more preferably 4.5 g/m$^2$ or less.

Conventional photographic additives which can be used in the present invention are described in the above mentioned three *Research Disclosures*, and portions thereof are identified in the following table.

| Additive | RD 17643 | RD 18716 | RD 307105 |
|---|---|---|---|
| 1. Chemical sensitizer | p. 23 | p. 648, right col. | p. 866 |
| 2. Sensitivity improver | — | p. 648, right col. | |
| 3. Spectral sensitizer & super-sensitizer | pp. 23 to 24 | p. 648, right col. to p. 649, right col. | pp. 866 to 868 |
| 4. Whitening agent | p. 24 | p. 647, right col. | p. 868 |
| 5. Anti-foggant & stabilizer | pp. 24 to 25 | p. 649, right col. | pp. 868 to 870 |
| 6. Light absorber, filter, dye, & UV absorber | pp. 25 to 26 | p. 649, right col. to p. 650, left col. | p. 873 |
| 7. Anti-stain agent | p. 25 right colm | p. 650, left col. to right col. | p. 872 |
| 8. Dye image stabilizer | p. 25 | p. 650, left col. | p. 872 |
| 9. Hardener | p. 26 | p. 651, left col. | pp. 874 to 875 |
| 10. Binder | p. 26 | p. 651, left col. | pp. 873 to 874 |
| 11. Plasticizer & lubricant | p. 27 | p. 650, right col. | p. 876 |
| 12. Coating aid & surface active agent | pp. 26 to 27 | p. 650, right col. | pp. 875 to 876 |
| 13. Anti-static agent | p. 27 | p. 650, right col. | pp. 876 to 877 |
| 14. Matting agent | — | — | pp. 878 to 879 |

In order to prevent deterioration of photographic performance attributable to formaldehyde gas, compounds capable of reacting with formaldehyde to fix it are preferably added to the light-sensitive material of the invention, as described in U.S. Pat. Nos. 4,411,987 and 4,435,503, the disclosure(s) of which is herein incorporated by reference.

The mercapto compounds described in U.S. Pat. Nos. 4,740,454 and 4,788,132, and JP-A-62-18539 and JP-A-

1-283551 are preferably incorporated into the light-sensitive material of the present invention.

Preferably, a compound capable of releasing a fogging agent, a development accelerator, a silver halide solvent or the precursor thereof, is incorporated into the light-sensitive material of the present invention, regardless of the amount of a developed silver which is formed by a development processing, as described in JP-A-1-106052.

Preferably, the dyes dispersed by the methods described in International Patent Publication WO88/04794 and JP-W-1-502912 (The term "JP-W" as used herein means an international application published by Japan Patent Office), or the dyes described in EP 317,308A, U.S. Pat. No. 4,420,555, the disclosure(s) of which is herein incorporated by reference, and JP-A-1-259358, are incorporated into the light-sensitive material of the present invention.

Various color couplers can be used in the light-sensitive material of the present invention. Examples thereof are described in the patents abstracted in the above mentioned *Research Disclosures* No. 17643, VII-C to G and No. 307105, VII-C to G.

Preferred yellow coupler are described in, for example, U.S. Pat. Nos. 3,933,501, 4,022,620, 4,326,024, 4,401,752, and 4,248,961, the disclosure(s) of which is herein incorporated by reference, JP-B-58-10739, British Patents 1,425,020 and 1,476,760, U.S. Pat. Nos. 3,973,968, 4,314,023 and 4,511,649, the disclosure(s) of which is herein incorporated by reference, and European Patent 249,473A.

Preferred magenta couplers include the 5-pyrazolone series and pyrazoloazole series compounds, particularly preferred magenta couplers are the compounds described in U.S. Pat. Nos. 4,310,619 and 4,351,897, the disclosure(s) of which is herein incorporated by reference, European Patent 73,636, U.S. Pat. Nos. 3,061,432 and 3,725,067, the disclosure(s) of which is herein incorporated by reference, *Research Disclosure* No. 24220 (June 1984), JP-A-60-33552, *Research Disclosure* No. 24230 (June 1984), JP-A-60-43659, JP-A-61-72238, JP-A-60-35730, JP-A-55-118034, and JP-A-60-185951, U.S. Pat. Nos. 4,500,630, 4,540,654, and 4,556,630, the disclosure(s) of which is herein incorporated by reference, and International Patent Publication WO88/04795.

Preferred cyan couplers include the phenol series and naphthol series cyan couplers. Particularly preferred cyan couplers are the compounds described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, and 4,327,173, the disclosure(s) of which is herein incorporated by reference, German Patent Publication 3,329,729, European Patents 121,365A and 249,453A, U.S. Pat. Nos. 3,446,622, 4,333,999, 4,775,616, 4,451,559, 4,427,767, 4,690,889, 4,254,212, and 4,296,199, the disclosure(s) of which is herein incorporated by reference, and JP-A-61-42658. Other cyan couplers including the pyrazoloazole series couplers described in JP-A-64-553, JP-A-64-554, JP-A-64-555, and JP-A-64-556, and the imidazole series couplers described in U.S. Pat. No. 4,818,672, can also be used in the present invention.

Polymerized dye-forming couplers may be included in the light-sensitive material of the present invention. Suitable couplers of this type for use in the present invention are described in, for example, U.S. Pat. Nos. 3,451,820, 4,080,211, 4,367,282, 4,409,320, and 4,576,910, the disclosure(s) of which is herein incorporated by reference, British Patent 2,102,173, and European Patent 341,188A.

A coupler capable of forming a developed dye having an appropriate dispersing property may be included in the light-sensitive material of the present invention. Suitable couplers of this type for use in the present invention are described in, for example, U.S. Pat. No. 4,366,237, the disclosure(s) of which is herein incorporated by reference, British Patent 2,125,570, European Patent 96,570, and German Patent (published) 3,234,533.

A colored coupler may be included in the light-sensitive material of the present invention for correcting unnecessary absorption of a developed dye. Suitable couplers of this type for use in the present invention are described in *Research Disclosure* No. 17643, Item VII-G and No. 307105, Item VII-G, U.S. Pat. No. 4,163,670, the disclosure(s) of which is herein incorporated by reference, JP-B-57-39413, U.S. Pat. Nos. 4,004,929 and 4,138,258, the disclosure(s) of which is herein incorporated by reference, and British Patent 1,146,368. Preferably, the coupler of this type is a fluorescent dye released during coupling, as described in U.S. Pat. No. 4,774,181, the disclosure(s) of which is herein incorporated By reference, or the couplers having, as a releasing group, a dye precursor group capable of reacting with a developing agent to form a dye, as described in U.S. Pat. No. 4,777,120, the disclosure(s) of which is herein incorporated by reference.

Preferably, compounds which release a photographically useful residue upon coupling are included in the light-sensitive material of the present invention. For example, a DIR coupler releasing a development inhibitor as described in the patents abstracted in above-mentioned *RD* No. 17643, Item VII-F and No. 307105, Item VII-F, JP-A-57-151944, JP-A-57-154234, JP-A-60-184248, JP-A-63-37346, and JP-A-63-37350, U.S. Pat. Nos. 4,248,962 and 4,782,012, the disclosure(s) of which is herein incorporated by reference, may be utilized in the present invention.

Bleaching accelerator-releasing couplers, as described in *RD* No. 11449 and 24241, and JP-A-61-201247 are effective for shortening the processing time for the light-sensitive material of the present invention having a bleaching ability. These couplers are particularly effective when they are added to a light-sensitive material in which the above-described tabular silver halide grains are used.

Preferably, a coupler which releases imagewise a nucleus-forming agent or a development accelerator during developing is included in the light-sensitive material of the present invention. Suitable couplers of this type are described in British Patents 2,097,140 and 2,131,188, and JP-A-59-157638 and JP-A-59-170840. Also, a compound releasing a fogging agent, a development accelerator and/or a silver halide solvent upon an oxidation-reduction reaction with the oxidation product of a developing agent, is included in the light-sensitive material of the present invention. Suitable compounds of this type are described in, for example, JP-A-60-107029, JP-A-60-252340, JP-A-1-44940 and JP-A-1-45687.

In addition to the above, the following couplers may be used in the light-sensitive material of the present invention: competitive couplers, as described in U.S. Pat. No. 4,130,427, the disclosure(s) of which is herein incorporated by reference; polyequivalent couplers, as described in U.S. Pat. Nos. 4,283,472, 4,338,393 and 4,310,618, the disclosure(s) of which is herein incorporated by reference; DIR redox compound-releasing couplers, DIR coupler-releasing couplers, DIR coupler-releasing redox compounds, or DIR redox-releasing redox compounds, as described in JP-A-60-185950 and JP-A-62-24252; couplers which release a dye the color of which is recovered after splitting off, as described in European Patents 173,302A and 313,308A; ligand-releasing couplers, as described in U.S. Pat. No. 4,555,477, the disclosure(s) of which is herein incorporated by reference; couplers which release a leuco dye, as described in JP-A-63-75747; and couplers which release a fluorescent dye, as described in U.S. Pat. No. 4,774,181.

Other couplers suitable for use in the present invention will be apparent to one skilled in the art.

The couplers can be incorporated into the light-sensitive material of the present invention by various conventional dispersing methods.

For example, an oil-in-water dispersion method may be utilized in the present invention for this purpose. Examples of a suitable high boiling point solvents for the oil-in-water dispersion method are described in U.S. Pat. No. 2,322,027, the disclosure(s) of which is herein incorporated by reference. In particular, examples of suitable high boiling point organic solvents which may be used in the oil-in-water dispersion method, the solvents having a boiling point of 175° C. or higher at normal (1 atm) pressure, include: phthalic acid esters, such as dibutyl phthalate, dicyclohexyl phthalate, di-2-ethylhexyl phthalate, decyl phthalate, bis(2,4-di-t-amylphenyl)phthalate, bis(2,4-di-t-amylphenyl)isophthalate, and bis(1,1-diethylpropyl)phthalate; phosphoric acid or phosphonic acid esters, such as triphenyl phosphate, tricresyl phosphate, 2-ethylhexyldiphenyl phosphate, tricyclohexyl phosphate, tri-2-ethylhexyl phosphate, tridodecyl phosphate, tributoxyethyl phosphate, trichloropropyl phosphate, and di-2-ethylhexylphenyl phosphate; benzoic acid esters, such as 2-ethylhexyl benzoate, dodecyl benzoate, and 2-ethylhexyl-p-hydroxybenzoate; amides, such as N,N-diethyldodecanamide, N,N-diethyllaurylamide, and N-tetradecylpyrrolidone; alcohols or phenols, such as isostearyl alcohol and 2,4-di-tertamylphenol; aliphatic carboxylic acid esters, such as bis(2-ethylhexyl)sebacate, dioctyl azelate, glycerol tributylate, isostearyl lactate, and trioctyl citrate; aniline derivatives, such as N,N-dibutyl-2-butoxy-5-tertoctylaniline; and hydrocarbons, such as paraffin, dodecylbenzene, and diisopropylnaphthalene. An auxiliary solvent may also be utilized in the oil-in-water dispersion method. Suitable auxiliary solvents include organic solvents having a boiling point of about 30° C. or higher, preferably 50° C. or higher and about 160° C. or lower. Examples of suitable auxiliary solvents include ethyl acetate, butyl acetate, ethyl propionate, methyl ethyl ketone, cyclohexanone, 2-ethoxyethyl acetate, and dimethylformamide.

Another dispersing method for incorporating the couplers into the light-sensitive material of the present invention includes a latex dispersing method using the latexes for impregnation as described in U.S. Pat. No. 4,199,363, and German Patent Applications (OLS) 2,541,274 and 2,541,230.

Preferably, various preservatives and anti-mold agents are incorporated into the light-sensitive material of the present invention. Suitable materials of this type include, for example, phenethyl alcohol, and 1,2-benzisothiazoline-3-one, n-butyl p-hydroxybenzoate, phenol, 4-chloro-3,5-dimethylphenol, 2-phenoxyethanol, and 2-(4-thiazolyl) benzimidazole, as described in JP-A-63-257747, JP-A-62-272248 and JP-A-1-80941.

Any suitable support may be used in the present invention, such as those described in, for example, the above-mentioned RD No. 17643, p. 28, No. 18716, p. 647, right column to p. 648, left column, and No. 307105, p. 879.

In the light-sensitive material of the present invention, the total thicknesses of all the hydrophilic colloid layers provided on a support side having an emulsion layer is preferably 28 $\mu$m or less, more preferably 23 $\mu$m or less, more preferably 18 $\mu$m or less, and more preferably 16 $\mu$m or less.

The layer swelling speed ($T_{\frac{1}{2}}$) of the light-sensitive material of the present invention is preferably 30 seconds or less, more preferably 20 seconds or less. By the term "layer thickness", as used in the present invention, is meant a layer thickness measured after standing at 25° C. and a relative humidity of 55% for two days. $T_{\frac{1}{2}}$ can be measured according to any conventional method. For example, $T_{\frac{1}{2}}$ can be measured with a swellometer of the type described in *Photographic Science and Engineering* written by A. Green et al, vol. 19, No. 2, pp. 124 to 129. By the term "$T_{\frac{1}{2}}$" is meant the time necessary to reach half the saturated layer thickness, where the saturated layer thickness corresponds to 90% of the maximum swelling layer thickness attained when the layer is processed in a color developing solution at 30° C. for 3 minutes and 15 seconds.

$T_{\frac{1}{2}}$ can be controlled by adding a hardener the gelatin binder or by varying the aging conditions after coating. The swelling ratio of the light-sensitive material of the present invention is preferably 150 to 400%, wherein the swelling ratio can be calculated from the maximum swollen layer thickness attained at the above-mentioned conditions according to the following equation:

(maximum swollen layer thickness—original layer thickness)÷original layer thickness.

A hydrophilic colloid layer (hereinafter referred to as a "back layer") having a total dry layer thicknesses of 2 to 20 $\mu$m is preferably provided on a side of the support opposite to the side having an emulsion layer thereon. Preferably, the above-mentioned light absorber, a filter dye, a UV absorber, an anti-static agent, a hardener, a binder, a plasticizer, a lubricant, a coating aid, and/or surface active agent, may be incorporated into the back layer. The swelling ratio of the back layer is preferably 150 to 500%.

Preferably, the color developing solution used for the development processing of the light-sensitive material of the present invention is an alkaline aqueous solution containing an aromatic primary amine type color developing agent as a primary component. An aminophenol compound is also useful as the color developing agent but a p-phenylenediamine type compound is preferably used. Examples of the foregoing include: 3-methyl-4-amino-N,N-diethylaniline, 3-methyl-4-amino-N-ethyl-N-$\beta$-hydroxyethylaniline, 3-methyl-4-amino-N-ethyl-$\beta$-methanesulfonamidethylaniline, 3-methyl-4-amino-N-ethyl-$\beta$-methoxyethylaniline, and sulfates, chlorinates and p-toluenesulfonates thereof. Of the foregoing, preferred is 3-methyl-4-amino-N-ethyl-N-$\beta$-hydroxyethylaniline sulfate. These compounds can be used in combination of two or more, if desired.

In general, a color developing solution which may be used to develop light-sensitive materials in accordance with the invention contains a pH buffer agent, such as a carbonate, borate or phosphate of an alkali metal, and a development inhibitor or anti-foggant, such as a chloride, bromide, iodide, benzimidazole, benzothiazole, or mercapto compound. Further, the color developing solution may include, if desired, various preservatives, such as hydroxylamine, diethylhydroxylamine, sulfite, hydrazines (e.g., N,N-biscarboxymethylhydrazine), phenyl semicarbazides, triethanolamine, and catecholsulfonic acids, an organic solvent, such as ethylene glycol and diethylene glycol, a development accelerator, such as benzyl alcohol, polyethylene glycol, a quaternary ammonium salt, and amines, a dye-forming coupler, a competitive coupler, an auxiliary developing agent, such as 1-phenyl-3-pyrazolidone, a tackifier, and various chelating agents, such as amino polycarboxylic acid, amino polyphosphonic acid, alkylphosphonic acid, and phosphonocarboxylic acid, for example, ethylenediaminetetracetic acid, nitrilotriactic acid, diethylenetriaminepentacetic acid, cyclohexanediaminetetracetic acid, hydroxyethyliminodiacetic acid, 1-hydroxyethylidene-1,1-diphosphonic acid, nitrilo-N,N,N-trimethylenephosphonic acid, ethylenediamine-N,N,N,N-tetramethylenephosphonic acid, ethylenediamine-di(o-hydroxyphenyl acetic acid), and salts thereof.

Next, there will be explained suitable processing solutions for a color reversal light-sensitive material in accordance with the present invention, other than a color developing solution, and the processing steps associated therewith.

Of the processing steps for the color reversal light-sensitive material of the present invention, the steps for processing from black-and-white development to color development are, in outline form (the details of which being understood by one skilled in the art) as follows:

1) Black-and-white developing-washing-reversal-color developing.
2) Black-and-white developing-washing-photo-reversal-color developing.
3) Black-and-white developing-washing-color developing.

All of the washing steps in processes (1) to (3) above can be replaced with a rinsing step, as described in U.S. Pat. No. 4,804,616 to simplify processing and reduce the amount of waste solution produced.

Next, the steps following color development will be explained, again in outline form, the details of which will be understood by one skilled in the art:

4) Color developing-adjusting-bleaching-fixing-washing-stabilizing.
5) Color developing-washing-bleaching-fixing-washing-stabilizing.
6) Color developing-adjusting-bleaching-washing-fixing-washing-stabilizing.
7) Color developing-washing-bleaching-washing-fixing-washing-stabilizing.
8) Color developing-bleaching-fixing-washing-stabilizing.
9) Color developing-bleaching-bleaching/fixing-washing-stabilizing.
10) Color developing-bleaching-bleaching/fixing-fixing-washing-stabilizing.
11) Color developing-bleaching-washing-fixing-washing-stabilizing.
12) Color developing-adjusting-bleaching/fixing-washing-stabilizing.
13) Color developing-washing-bleaching/fixing-washing-stabilizing.
14) Color developing-bleaching/fixing-washing-stabilizing.
15) Color developing-fixing-bleaching/fixing-washing-stabilizing.

In processes (4) to (15), the washing steps immediately before the stabilizing step may be omitted, and the stabilizing process may be omitted. Any one of processes (1) to (3) and any one of processes (4) to (15) may be combined to form a color reversal process.

Next, processing solutions suitable for color reversal processing of the light-sensitive materials of the present invention will be explained.

A conventional developing agent can be used in the black-and-white developing solution suitable for developing the light-sensitive material of the present invention. For example, the following developing agents can be used alone or in combination: dihydroxybenzenes, for example, hydroquinone; 3-pyrazolidones, for example, 1-phenyl-3-pyrazolidone; aminophenols, for example, N-methyl-p-aminophenol; 1-phenyl-3-pyrazolines, ascorbic acid, and heterocyclic compounds similar to the compound obtained by condensing a compound containing a 1,2,3,4-tetrahydroquinoline ring and a compound containing an indolene ring, as described in U.S. Pat. No. 4,067,872, the disclosure(s) of which is herein incorporated by reference.

In addition to the above, if desired, the following can be incorporated into the black-and-white developing solution which is used to develop the light-sensitive material of the present invention: a preservative, for example, sulfite and bisulfite; a buffer agent, for example, carbonate, boric acid, borate, and alkanolamine; an alkali agent, for example, hydroxide and carbonate; a dissolution aid, for example, a polyethylene glycol and esters thereof; a pH controlling agent, for example, an organic acid, such as acetic acid; a sensitizer, for example, a quaternary ammonium salt; a development accelerator; a surface active agent; a defoaming agent; a hardener; and a tackifier.

A compound acting as a silver halide solvent is required in the black-and-white developing solution used in the present invention. Sulfite added to the developing solution as the preservative acts as a silver halide solvent. Examples of a suitable sulfite and other suitable silver halide solvents for use in the developing solution include: KSCN, NaSCN, $K_2SO_3$, $Na_2SO_3$, $K_2S_2O_5$, $Na_2S_2O_5$, $K_2S_2O_3$, and $Na_2S_2O_3$.

The developing solution used in developing the light-sensitive material of the present invention may have any suitable pH to give a desired density and contrast. Preferably, the pH of the developing solution is about 8.5 to about 11.5.

When sensitizing a light-sensitive material of the invention using a black-and-white developing solution as described above, the time for carrying out the sensitization may be extended up to about three times the standard processing time, at a maximum. In this regard, an increased processing temperature can shorten the time necessary for the sensitization.

Preferably, the pH of the color developing solution and black-and-white developing solution used to develop the light-sensitive material of the invention is 9 to 12.

The replenishing amount of the developing solution depends on the color photographic light-sensitive material processed. Preferably, the replenishing amount is 3 liters or less per square meter of light-sensitive material. The replenishing amount may be reduced to 500 ml by maintaining a reduced bromide ion concentration in the replenishing solution. In order to reduce the replenishing amount of developing solution, the area of processing bath which contacts air is preferably reduced to thereby prevent evaporation and air oxidation of the solution.

In this regard, the area of photographic processing solution contacting air in a processing bath can be expressed by an aperture ratio defined as follows:

Aperture ratio = [area of a solution contacting air $(cm^2)$] ÷ [volume of the processing solution $(cm^3)$].

When developing the light-sensitive material of the present invention, the above described aperture ratio is preferably 0.1 or less, more preferably 0.001 to 0.05. Examples of suitable methods for reducing the aperture ratio which may be used when developing the light-sensitive material of the present invention include the method described in JP-A-1-82033, in which a movable lid is used, the slit development processing method described in JP-A-63-216050, and the method in which a shielding means, such as a floating lid, is put on the surface of a photographic processing solution in a processing bath. The aperture ratio is preferably reduced in both color development and black/white development, and also during the various steps following such development, for example, during bleaching, bleach/fixing, fixing, rinsing and stabilizing. Further, as mentioned above, a means for controlling the accumulation of bromide ions in the developing solution can be used to reduce the replenishing amount of developing solution.

A reversal bath used after black-and-white development of the light-sensitive material of the invention can contain a conventional fogging agent. For example, it may include a stannous ion complex salt, such as a stannous ion-organic phosphoric acid complex salt as described in U.S. Pat. No. 3,617,282, the disclosure(s) of which is herein incorporated by reference, a stannous ion-organic phosphonocarboxylic acid complex salt as described in JP-B-56-32616, a stannous ion aminopolycarboxylic acid salt as described in U.S. Pat. No. 1,209,050, the disclosure(s) of which is herein incorporated by reference, a boran compound, such as a boran hydride compound as described in U.S. Pat. No. 2,984,567, and a heterocyclic amine boran compound as described in British Patent 1,011,000. The pH of such a fogging bath (i.e., a reversal bath) may be any suitable value extending over a wide range from an acid value to an alkaline value, and it preferably is within the range of 2 to 12, more preferably 2.5 to 10, and more preferably 3 to 9. A photoreversal treatment by reexposure may be carried out in place of the reversal process reversal bath, and the fogging agents described above can be added to a color developing solution to omit the reversal process.

The silver halide color photographic light-sensitive material of the present invention may be subjected to a bleaching process or a bleach-fixing process after color development. These processings may be carried out immediately after color development without going through other processing, or the bleaching process or the bleach-fixing process may be carried out after the processing for stopping, controlling and washing following the color development. The latter is advantageous in order to prevent unnecessary after-development and air fogging, reduce the carry-over of color developing solution into a desilvering process, and washing out of sensitizing dye, dye contained in the photographic light-sensitive material and color developing agent impregnated in the light-sensitive material, rendering them harmless.

A photographic emulsion layer is usually subjected to a bleaching process after color development processing. The bleaching process may be carried out at the same time as a fixing process (bleach-fixing process) or may be independently carried out. Further, a processing method may be utilized in which a bleach-fixing process is carried out after the bleaching process in order to accelerate processing. Further, the bleaching process can be carried out in, for example, two successive bleach-fixing baths. Also, a fixing process may be carried out before a bleaching-fixing process, and a bleacing process may be carried out after a bleach-fixing process. Suitable bleaching agent which may be used to process the light-sensitive material of the present invention include, for example, compounds of polyvalent metals, such as iron (III), peracids, quinones, and nitro compounds. Other suitable bleaching agents include an organic complex salt of iron (III), for example, aminopolycarboxylic acids, such as ethylenediaminetetracetic acid, diethylenetriaminepentacetic acid, cyclohexanediaminetetraacetic acid, methyliminodiacetic acid, 1,3-diaminopropanetetracetic acid, and glycol ether diaminetetraacetic acid, and complex salts of citric acid, tartaric acid and malic acid. Of the foregoing preferred, from the viewpoint of rapid processing and possible environmental pollution, are aminopolycarboxylic acid iron (III) complex salts including ethylenediaminetetraacetic acid iron (III) complex salt and a 1,3-diaminopropanetetraacetic acid iron (III) complex salt. Further, the aminopolycarboxylic acid iron (III) complex salts are particularly useful either for a bleaching solution or a bleach-fixing solution. A bleaching solution or bleach-fixing solution in which these aminopolycarboxylic acid iron (III) complex salts may be used may have a pH of 4.0 to 8, and processing can be carried out, as one skilled in the art will appreciate, also at a lower pH for the purpose of accelerating processing.

A bleaching accelerator may be used in a bleaching bath, a bleach-fixing bath and the pre-baths thereof used to process the light-sensitive material of the present invention, if desired. Examples of suitable bleaching accelerators include the following: compounds having a mercapto group or a disulfide group, as described in U.S. Pat. No. 3,893,858, the disclosure(s) of which is herein incorporated by reference, German Patents 1,290,812 and 2,059,988, JP-A-53-32736, JP-A-53-57831, JP-A-53-37418, JP-A-53-72623, JP-A-53-95630, JP-A-53-95631, JP-A-53-104232, JP-A-53-124424, JP-A-53-141623, and JP-A-53-28426, and *Research Disclosure* No. 17129 (July 1978); thiazolidine derivatives as described in JP-A-50-140129; thiourea derivatives as described in JP-B-45-8506, JP-A-52-20832 and 53-32735, and U.S. Pat. No. 3,706,561; iodides as described in German Patent 1,127,715 and JP-A-58-16235; polyoxyethylene compounds, as described in German Patents 966,410 and 2,748,430; polyamine compounds, as described in JP-B-45-8836; the compounds described in JP-A-49-40943, JP-A-49-59644, JP-A-53-94927, JP-A-54-35727, JP-A-55-26506, and JP-A-58-163940; and bromide ions. Of the foregoing, the compounds having a mercapto group or a disulfide group are preferred because they have a relatively larger acceleration effect, and the compounds described in U.S. Pat. Nos. 3,893,858 and 4,552,834, German Patent 1,290,812, and JP-A-53-95630 are preferred. It will be understood by one skilled in the art that these bleaching accelerators may be incorporated into the light-sensitive material. The bleaching accelerators are particularly useful when a color light-sensitive material for photographing is bleached and fixed.

In addition to the above compounds, an organic acid is preferably incorporated into a bleaching solution and a bleach-fixing solution used to process the light-sensitive material of the present invention for the purpose of preventing a bleaching stain. Preferred organic acids include compounds having an acid dissociation constant (pKa) of 2 to 5. Preferably, the organic acid is acetic acid, propionic acid or hydroxyacetic acid.

Any suitable fixing agent can be used in the fixing solution and the bleach-fixing solution used for processing the light-sensitive material of the present invention. For example, the fixing agent may be a thiosulfate, a thiocyanate, a thioether series compound, a thiourea, and various bromides. Thiosulfates are preferred, and more preferred are ammonium thiosulfates. Further, thiosulfates, thiocyanates, the thioether series compounds, and thioureas are preferably used in combination. The fixing solution and the bleach-fixing solution preferably include a preservative which preferably is a sulfite, bisulfate, carbonyl bisulfurous acid adduct, or the sulfinic acid compounds described in European Patent 294769A. Further, various aminopolycarboxylic acids and organic phosphonic acids are preferably added to the fixing solution and the bleach-fixing solution for the purpose of stabilizing the solutions.

In processing the light-sensitive material of the present invention, a reduced total time for desilvering is preferred, so long as no inferior desilvering occurs. Preferably, this time is preferably 1 to 3 minutes, more preferably 1 to 2 minutes. Also, the desilvering temperature is preferably 25° to 50° C., more preferably 35° to 45° C. It will be appreciated that in the preferred temperature range, the desilvering speed after processing is increased and in addition, staining is effectively prevented.

In the desilvering processing used to develop the light-sensitive material of the present invention, stirring is preferably strengthened as much as possible. Examples of suitable methods for strengthening stirring include the method described in JP-A-62-183460, in which a jet stream of a processing solution impinges the emulsion side of a light-sensitive material, the method described in JP-A-62-183461, in which a stirring effect is increased with a rotating means, a method in which a stirring effect is improved by moving a light-sensitive material while contacting an emulsion layer side thereof with a wiper blade to cause a turbulent flow on an emulsion layer surface, and a method in which the circulating flow amount of the whole processing solution is increased. Such methods for improving stirring are effective for the bleaching solution, the bleach-fixing solution and the fixing solution. Improved stirring accelerates the supply of the bleaching solution and the fixing solution into an emulsion layer and results in raising the desilvering speed. It will be understood that the above mentioned means for improving stirring are more effective when a bleaching accelerator is used and makes it possible to markedly increase the effectiveness of the bleaching accelerator and prevent disturbing of the fixing, which is caused by the bleaching accelerator.

An automatic processor may be used to process the light-sensitive material of the present invention and, if so, is preferably equipped with a light-sensitive material transporting means as described in JP-A-60-191257, JP-A-60-191258 and JP-A-60-191259. As described in JP-A-191257, such a transporting means can notably reduce the amount of processing solution carried over from a preceding bath to a following bath, and reduce deterioration of the performance of a processing solution. This shortens processing time in each process and reduces the replenishing amount of a processing solution needed.

The silver halide color light-sensitive material of the present invention may be subjected to a washing process and/or a stabilizing process after a desilvering process. The amount of washing water used in the washing process varies according to the conditions of the washing, such as the characteristics of the light-sensitive material including, for example, the substances used, such as a coupler, the applications thereof, the washing water temperature, the number of washing tanks (i.e., the number of stages), the replenishing manner, such as a counter-current flow or regular current flow, and various other conditions. The other conditions include the relationship of the number of the washing tanks to the water quantity in the multi-stage countercurrent system, which can be obtained by the method described in *Journal of the Society of Motion Picture and Television Engineers*, vol. 64, pp. 248 to 253 (May 1955). The amount of washing water can be decreased to a large extent according to the multi-stage countercurrent system described in the above literature. However, it will be appreciated that prolonging the residence time of water in the tanks increases growth of bacteria which causes the problem of floating materials which stick to the light-sensitive material. In processing of the light-sensitive material of the present invention, the method for reducing calcium and magnesium ions as described in JP-A-62-288838 can be quite effectively used as a means for solving bacteria growth. In this regard, there can be used the isothiazolone compounds and cyabendazoles described in JP-A-57-8542, a chlorinine series bactericide, such as chlorinated sodium isocyanurate, benzotriazoles, and the bactericides described in "Chemistry of Anti-bacteria and Anti-mold" written by H. Horiguchi, published by Sankyo Co. (1986), "Disinfection and Anti-mold Technology of Microbials" published by Hygiene Technology Institute (1982), Industrial Technology Society, and "Bactericide and Fungicide Dictionary (1986)" published by The Society for Anribacterial and Antifungal Agents, Japan.

Washing water used in the processing of the light-sensitive material of the present invention preferably has a pH of 4 to 9, more preferably 5 to 8. The washing temperature and a washing time can vary according to the characteristics and applications of the light-sensitive material. In general, the washing temperature preferably ranges from 15° to 45° C. and the washing time preferably ranges from 20 seconds to 10 minutes, more preferably the washing temperature ranges from 25° to 40° C. and the washing time ranges from 30 seconds to 5 minutes. It will be appreciated that the light-sensitive material of the present invention can be directly processed in a stabilizing solution in place of the above mentioned washing water. If so, conventional stabilizing processing methods may be utilized, as described in JP-A-57-8543, JP-A-58-14834, and JP-A-60-220345.

If desired, a stabilizing process may be carried out following the above mentioned washing process. For example, a stabilizing bath which is used as the final bath for a light-sensitive material for photographing, and which contains a dye stabilizer and a surface active agent, may be used for this purpose. Suitable dye stabilizer include aldehydes, such formalin and glutaraldehyde, an N-methylol compound, hexamethylenetetramine, and an aldehyde sulfurous acid adduct. Various chelating agents and anti-mold agents may be included in the stabilizing bath.

An overflow solution generated by the replenishing of the above mentioned washing and/or stabilizing solutions can be reused in the other processes, such as the desilvering process.

If the above-described processing solutions are concentrated due to vaporization during processing with an automatic processor, water is preferably added to correct the concentration thereof.

A color developing agent may be incorporated into the silver halide color light-sensitive material of the present invention for the purposes of simplifying and accelerating processing. various precursors of the developing agents are preferably used in this regard. Examples thereof include the indoaniline series compounds described in, for example, U.S. Pat. No. 3,342,597, the disclosure(s) of which is herein incorporated by reference, the Schiff base type compounds described in U.S. Pat. No. 3,342,599, the disclosure(s) of which is herein incorporated by reference, and Research Disclosure No. 14,850 and No. 15,159, the aldol compounds described in Research Disclosure No. 13,924, the metal salt complexes described in U.S. Pat. No. 3,719,492, the disclosure(s) of which is herein incorporated by reference, and the urethane series compounds described in JP-A-53-135628.

Various 1-phenyl-3-pyrazolidones may be incorporated into the silver halide color light-sensitive material of the present invention for the purpose of accelerating color development, if desired. Compounds suitable for this purpose are described in JP-A-56-64339, JP-A-57-144547, and JP-A-58-115438.

In the present invention, various processing solutions may be used at 10° to 50° C. In this regard, a temperature of 33° to 38° C. is conventional. This temperature may be higher to accelerate processing for reducing the processing time, or lower to increase image quality and improve the stability of the processing solutions.

EXAMPLES

The present invention will be explained below in further detail with reference to the following examples, but the present invention will not be limited thereto.

Example 1

(1) Preparation of a magnetic paint

The magnetic paint component of the following Composition 1 was put in an open kneader and kneaded for 1 hour. Then, a solvent and a binder were added to prepare the magnetic paint of Composition 2, and this was dispersed with a pin type mill. Subsequently, the binder and the solvent were further added for dilution resulting in Composition 3, whereby the coating solution was prepared.

| Composition 1: | |
|---|---|
| Co-containing acicular γ-iron oxide fine powder (SBET: 45.0 g/m$^2$, Hc: 800 Oe, σs: 70 emu/g) | 1000 weight parts |
| Diacetyl cellulose | 20 weight parts |
| Methyl ethyl ketone | 90 weight parts |
| Cyclohexanone | 90 weight parts |
| Composition 2: | |
| Co-containing acicular γ-iron oxide fine powder (SBET: 45.0 g/m$^2$, Hc: 800 Oe, σs: 70 emu/g) | 10 weight parts |
| Diacetyl cellulose | 10 weight parts |
| Methyl ethyl ketone | 45 weight parts |
| Cyclohexanone | 45 weight parts |
| Composition 3: | |
| Co-containing acicular γ-iron oxide fine powder (SBET: 45.0 g/m$^2$, Hc: 800 Oe, σs: 70 emu/g) | 1 weight part |
| Diacetyl cellulose | 10 weight parts |
| Methyl ethyl ketone | 100 weight parts |
| Cyclohexanone | 100 weight parts |
| Coronate L (manufactured by Nippon Polyurethane Co., Ltd.) | 2 weight parts |

(2) Preparation of a base

The following subbing solution was coated on a polyethylene terephthalate base (90 μm thickness) which was subjected in advance to a UV ray irradiation treatment, and dried. Then, the magnetic paint coating solution prepared in above (1) was coated thereon, and dried. The coated amount was controlled so that the optical density (Dmax) of a magnetic recording layer obtained became 0.10. The magnetic recording layer of the base thus obtained had a thickness of about 1 μm. A magnetic field orientation treatment was carried out during the drying stage. The magnetic field orientation treatment was carried out by locating a magnet having a magnetic strength of 3000 gauss at positions corresponding to certain residual solvent contents of the magnetic layer.

Two magnets having the same pole and the same magnetic strength were located so that the base was located therebetween with a distance of each magnet to the base set at 10 mm. The side having thereon the magnetic recording layer was a back face.

| Subbing solution: | |
|---|---|
| SnO$_2$/Sb$_2$O$_3$/SiO$_2$ (90/10/0.5, average particle size: 0.15 μm) | 0.18 mg/m$^2$ |
| Diacetyl cellulose | 0.32 g/m$^2$ |
| Aerosil | 0.02 g/m$^2$ |
| Polymethyl methacrylate | 0.32 g/m$^2$ |
| Poly(methyl methacrylate/divinylstyrene) (mole ratio 95:5, average particle size: 0.2 μm) | 0.01 g/m$^2$ |
| Dimethyl silicon | 0.01 g/m$^2$ |

(3) Preparation of the light-sensitive material

The respective layers of the following compositions were simultaneously coated to prepare a sample which was a multi-layer color light-sensitive material. The ingredients UV absorber U-1, etc., Oil-1 are defined below.

| First layer: an anti-halation layer | |
|---|---|
| Black colloidal silver | 0.20 g |
| Gelatin | 1.9 g |
| UV absorber U-1 | 0.1 g |
| UV absorber U-3 | 0.04 g |
| UV absorber U-4 | 0.1 g |
| High-boiling point solvent Oil-1 | 0.1 g |
| Fine crystal solid dispersion of Dye E-1 | 0.1 g |
| Second layer: an intermediate layer | |
| Gelatin | 0.40 g |
| Compound Cpd-C | 5 mg |
| Compound Cpd-J | 5 mg |
| Compound Cpd-K | 3 mg |
| High-boiling point solvent Oil-3 | 0.1 g |
| Dye D-4 | 0.8 mg |
| Third layer: an intermediate layer | |
| Fine grain silver bromoiodide emulsion, the surface and inside of which were fogged (average grain size: 0.06 μm, fluctuation coefficient: 18%, AgI content: 1 mole %) | silver 0.05 g |
| Gelatin | 0.4 g |
| Fourth layer: a low red-sensitive layer | |
| Emulsion A | silver 0.3 g |
| Emulsion B | silver 0.2 g |
| Gelatin | 0.8 g |
| Coupler C-1 | 0.15 g |
| Coupler C-2 | 0.05 g |
| Coupler C-3 | 0.05 g |
| Coupler C-9 | 0.05 g |
| Compound Cpd-C | 5 mg |
| Compound Cpd-J | 5 mg |
| High-boiling point solvent Oil-2 | 0.1 g |
| Additive P-1 | 0.1 g |
| Fifth layer: a medium red-sensitive layer | |
| Emulsion B | silver 0.2 g |
| Emulsion C | silver 0.3 g |
| Gelatin | 0.8 g |
| Coupler C-1 | 0.2 g |
| Coupler C-2 | 0.05 g |
| Coupler C-3 | 0.2 g |
| High-boiling point solvent Oil-2 | 0.1 g |
| Additive P-1 | 0.1 g |
| Sixth layer: a high red-sensitive layer | |
| Emulsion D | silver 0.4 g |
| Gelatin | 1.1 g |
| Coupler C-1 | 0.3 g |
| Coupler C-2 | 0.1 g |
| Coupler C-3 | 0.7 g |
| Additive P-1 | 0.1 g |
| Seventh layer: an intermediate layer | |
| Gelatin | 0.6 g |
| Additive M-1 | 0.3 g |
| Anti-color mixing agent Cpd-I | 2.6 mg |
| Dye D-5 | 0.02 g |
| Compound Cpd-J | 5 mg |
| High-boiling solvent Oil-1 | 0.02 g |
| Eighth layer: an intermediate layer | |
| Silver bromoiodide emulsion, the surface and inside of which were fogged (average grain size: 0.06 μm, fluctuation coefficient: 16%, AgI content: 0.3 mole %) | silver 0.02 g |
| Gelatin | 1.0 g |
| Additive P-1 | 0.2 g |
| Anti-color mixing agent Cpd-A | 0.1 g |
| Compound Cpd-C | 0.1 g |
| Ninth layer: a low green-sensitive layer | |
| Emulsion E | silver 0.1 g |
| Emulsion F | silver 0.2 g |
| Emulsion G | silver 0.2 g |
| Gelatin | 0.5 g |
| Coupler C-4 | 0.1 g |
| Coupler C-7 | 0.05 g |
| Coupler C-8 | 0.20 g |
| Compound Cpd-B | 0.03 g |
| Compound Cpd-D | 0.02 g |
| Compound Cpd-E | 0.02 g |
| Compound Cpd-F | 0.04 g |
| Compound Cpd-J | 10 mg |
| Compound Cpd-L | 0.02 g |
| High-boiling point solvent Oil-1 | 0.1 g |
| High-boiling point solvent Oil-2 | 0.1 g |
| Tenth layer: a medium green-sensitive layer | |
| Emulsion G | silver 0.3 g |
| Emulsion H | silver 0.1 g |
| Gelatin | 0.6 g |
| Coupler C-4 | 0.1 g |
| Coupler C-7 | 0.2 g |
| Coupler C-8 | 0.1 g |
| Compound Cpd-B | 0.03 g |
| Compound Cpd-D | 0.02 g |
| Compound Cpd-E | 0.02 g |
| Compound Cpd-F | 0.05 g |
| Compound Cpd-L | 0.05 g |
| High-boiling point solvent Oil-2 | 0.01 g |
| Eleventh layer: a high green-sensitive layer | |
| Emulsion I | silver 0.5 g |
| Gelatin | 1.0 g |
| Coupler C-4 | 0.3 g |
| Coupler C-7 | 0.1 g |
| Coupler C-8 | 0.1 g |
| Compound Cpd-B | 0.08 g |
| Compound Cpd-E | 0.02 g |
| Compound Cpd-F | 0.04 g |
| Compound Cpd-K | 5 mg |
| Compound Cpd-L | 0.02 g |
| High-boiling point solvent Oil-1 | 0.02 g |
| High-boiling point solvent Oil-2 | 0.02 g |
| Twelfth layer: an intermediate layer | |
| Gelatin | 0.6 g |
| Compound Cpd-L | 0.05 g |
| High-boiling point solvent Oil-1 | 0.05 g |
| Thirteenth layer: a yellow filter layer | |
| Yellow colloidal silver | silver 0.07 g |
| Gelatin | 1.1 g |
| Anti-color mixing agent Cpd-A | 0.01 g |
| Compound Cpd-L | 0.01 g |
| High-boiling point solvent Oil-1 | 0.01 g |
| Fine crystal solid dispersion of Dye E-2 | 0.05 g |
| Fourteenth layer: an intermediate layer | |
| Gelatin | 0.6 g |
| Fifteenth layer: a low blue-sensitive layer | |
| Emulsion J | silver 0.2 g |
| Emulsion K | silver 0.3 g |
| Gelatin | 0.8 g |
| Coupler C-5 | 0.2 g |
| Coupler C-6 | 0.1 g |
| Coupler C-10 | 0.4 g |
| Sixteenth layer: a medium blue-sensitive layer | |
| Emulsion L | silver 0.5 g |
| Gelatin | 0.9 g |
| Coupler C-5 | 0.1 g |
| Coupler C-6 | 0.1 g |
| Coupler C-10 | 0.6 g |
| Seventeenth layer: a high blue-sensitive layer | |
| Emulsion M | silver 0.2 g |
| Emulsion N | silver 0.2 g |
| Gelatin | 1.2 g |
| Coupler C-5 | 0.1 g |
| Coupler C-6 | 0.1 g |
| Coupler C-10 | 0.6 g |
| High-boiling point solvent Oil-2 | 0.1 g |
| Eighteenth layer: the first protective layer | |
| Gelatin | 0.7 g |
| UV absorber U-1 | 0.2 g |
| UV absorber U-2 | 0.05 g |
| UV absorber U-5 | 0.3 g |
| Formalin scavenger Cpd-H | 0.4 g |
| Dye D-1 | 0.15 g |
| Dye D-2 | 0.05 g |
| Dye D-3 | 0.1 g |
| Nineteenth layer: the second protective layer | |

-continued

| | |
|---|---|
| Colloidal silver | silver 0.1 mg |
| Fine grain silver bromoiodide emulsion (average grain size: 0.06 μm, AgI content: 1 mole %) | silver 0.1 g |
| Gelatin | 0.4 g |
| Twentieth layer: the third protective layer | |
| Gelatin | 0.4 g |
| Polymethyl methacrylate (average grain size: 1.5 μm) | 0.1 g |
| Copolymer of methyl methacrylate and acrylic acid (4:6) (average grain size: 1.5 μm) | 0.1 g |
| Silicon oil | 0.03 g |
| Surface active agent W-1 | 3.0 mg |
| Surface active agent W-2 | 0.03 g |

In addition to the above components, the additives F-1 to F-8 were added to all of the emulsion layers. Further, a gelatin hardener H-1 and the surface active agents W-3, W-4, W-5 and W-6 for coating and emulsifying were added to each of the layers in addition to the above components.

Further, phenol, 1,2-benzisothiazoline-3-one, 2-phenoxyethanol, phenethyl alcohol and butyl p-benzoate were added as a fungicide and an anti-mold agent.

Table 1 below describes silver bromoiodide emulsions A to N mentioned above. Tables 2 and 3 below describe the spectral sensitization of emulsions A to N.

TABLE 1

| Emulsion | Characteristics of grains | Sphere-corresponding average grain size (μm) | Fluctuation coefficient (%) | AgI content (%) |
|---|---|---|---|---|
| A | Monodispersed tetradecahedral grains | 0.28 | 16 | 4.0 |
| B | Monodispersed cubic, internal latent image type grains | 0.30 | 10 | 4.0 |
| C | Monodispersed cubic grains | 0.38 | 10 | 5.0 |
| D | Monodispersed tabular grains, average aspect ratio: 3.0 | 0.68 | 15 | 2.0 |
| E | Monodispersed cubic grains | 0.20 | 17 | 4.0 |
| F | Monodispersed tetradecahedral grains | 0.23 | 16 | 4.0 |
| G | Monodispersed cubic, internal latent image type grains | 0.28 | 11 | 4.0 |
| H | Monodispersed cubic grains | 0.32 | 9 | 3.5 |
| I | Monodispersed tabular grains, average aspect ratio: 5.0 | 0.80 | 15 | 2.0 |
| J | Monodispersed cubic grains | 0.30 | 18 | 4.0 |
| K | Monodispersed tetradecahedral grains | 0.45 | 17 | 4.0 |
| L | Monodispersed tabular grains, average aspect ratio: 5.0 | 0.55 | 13 | 2.0 |
| M | Monodispersed tabular grains, average aspect ratio: 6.0 | 1.00 | 15 | 1.5 |
| N | Monodispersed tabular grains, average aspect ratio: 9.0 | 1.20 | 17 | 1.5 |

TABLE 2

Spectral sensitization of Emulsions A to I

| Emulsion | Sensitizing dye added | Added amount per mol of silver halide (g) |
|---|---|---|
| A | S-2 | 0.025 |
| | S-3 | 0.25 |
| | S-8 | 0.01 |
| B | S-1 | 0.01 |
| | S-3 | 0.25 |
| | S-8 | 0.01 |
| C | S-1 | 0.01 |
| | S-2 | 0.01 |
| | S-3 | 0.25 |
| | S-8 | 0.01 |
| D | S-2 | 0.01 |
| | S-3 | 0.10 |
| | S-8 | 0.01 |
| E | S-4 | 0.5 |
| | S-5 | 0.1 |
| F | S-4 | 0.3 |
| | S-5 | 0.1 |
| G | S-4 | 0.25 |
| | S-5 | 0.08 |
| | S-9 | 0.05 |
| H | S-4 | 0.2 |
| | S-5 | 0.06 |
| | S-9 | 0.05 |
| I | S-4 | 0.3 |
| | S-5 | 0.07 |
| | S-9 | 0.1 |

TABLE 3

Spectral sensitization of Emulsions J to N

| Emulsion | Sensitizing dye added | Added amount per mol of silver halide (g) |
|---|---|---|
| J | S-6 | 0.05 |
| | S-7 | 0.2 |
| K | S-6 | 0.05 |
| | S-7 | 0.2 |
| L | S-6 | 0.06 |
| | S-7 | 0.22 |
| M | S-6 | 0.04 |
| | S-7 | 0.15 |
| N | S-6 | 0.06 |
| | S-7 | 0.22 |

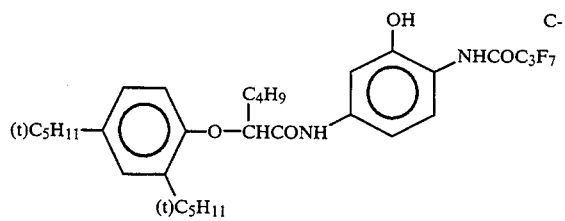
C-1
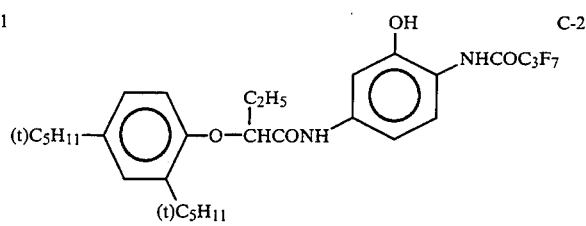
C-2
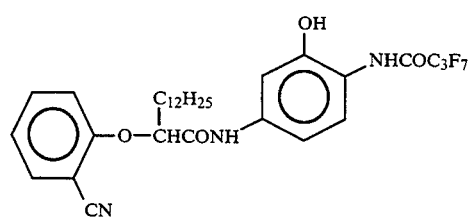
C-3
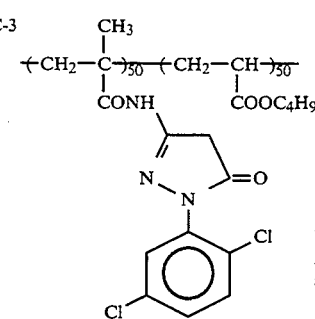
C-4
Numerals represent wt %.
Average molecular weight: about 25,000
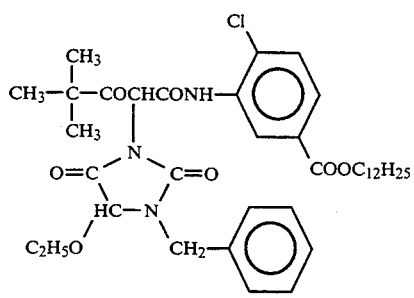
C-5
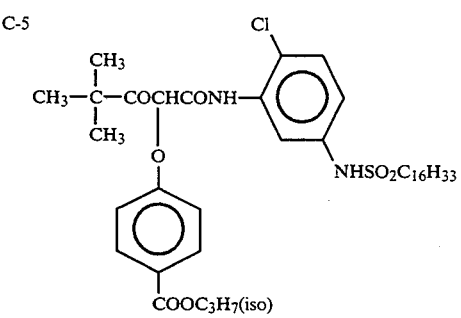
C-6
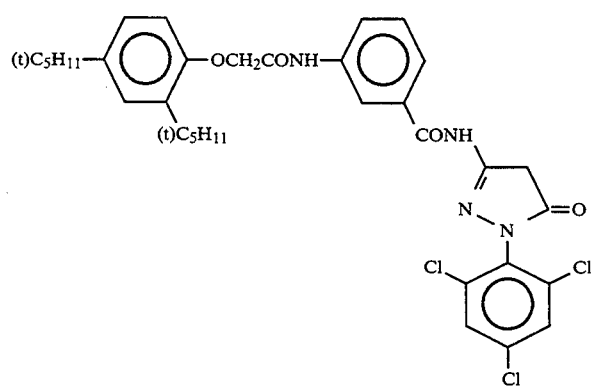
C-7
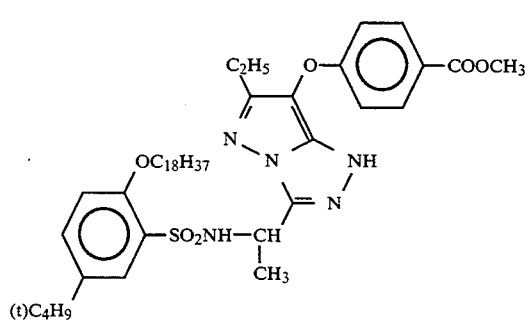
C-8
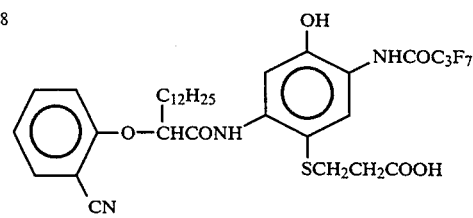
C-9

-continued
C-10    Dibutyl phthalate    Oil-1
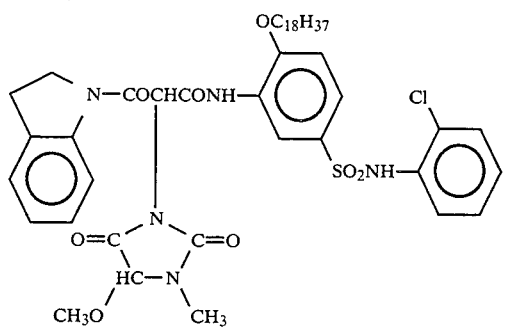
Tricresyl phosphate    Oil-2 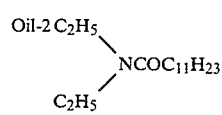 Oil-3
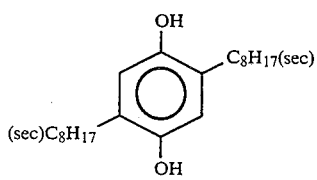 Cpd-A    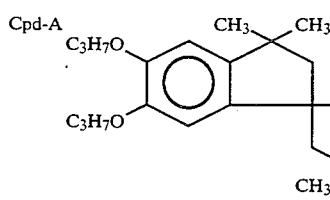 Cpd-B
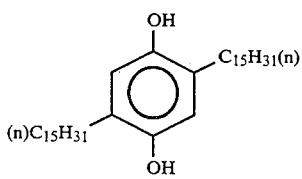 Cpd-C    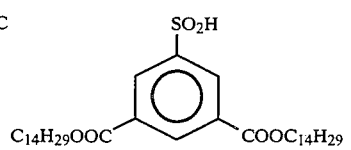 Cpd-D
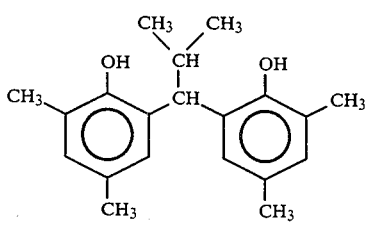 Cpd-E    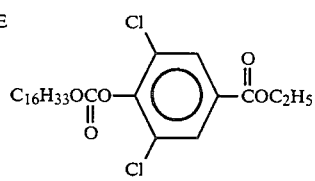 Cpd-F
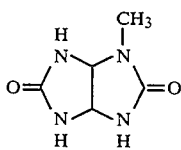 Cpd-H    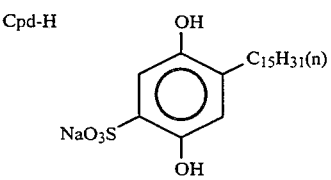 Cpd-I
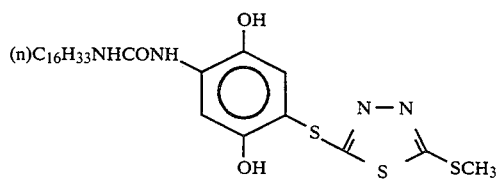 Cpd-J
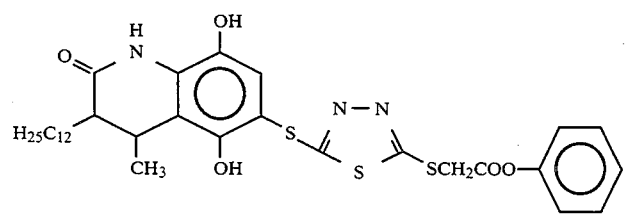 Cpd-K

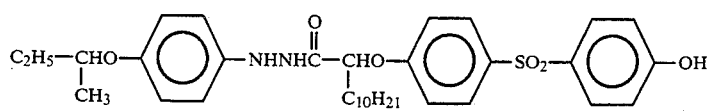
Cpd-L
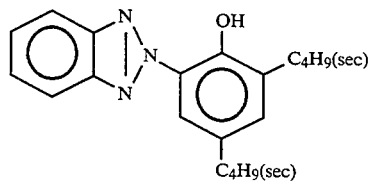
U-1
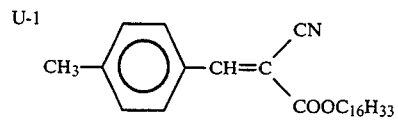
U-2
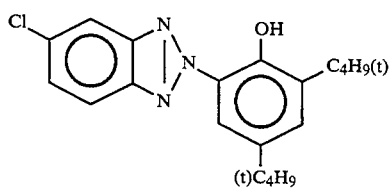
U-3
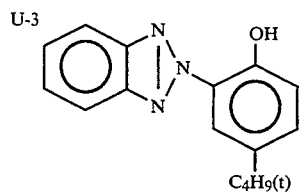
U-4
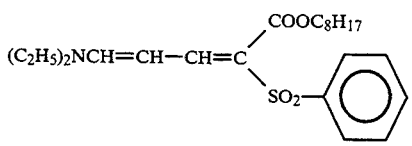
U-5
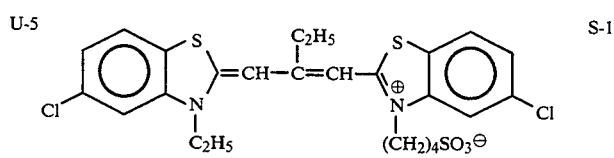
S-1
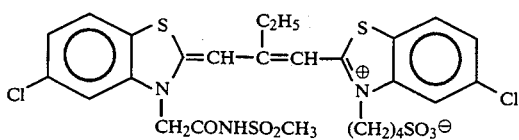
S-2
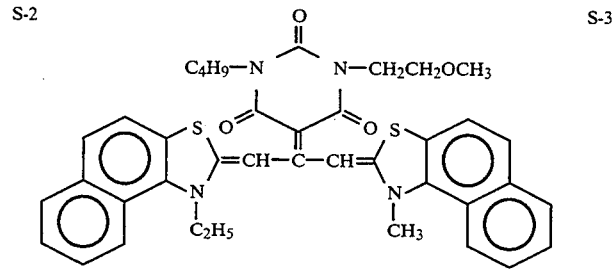
S-3
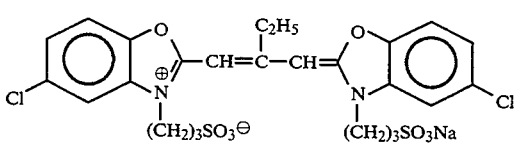
S-4
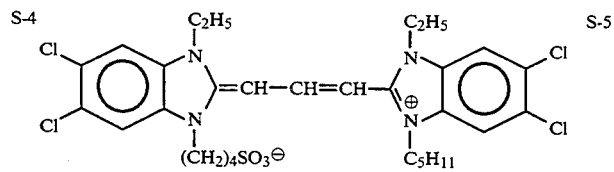
S-5
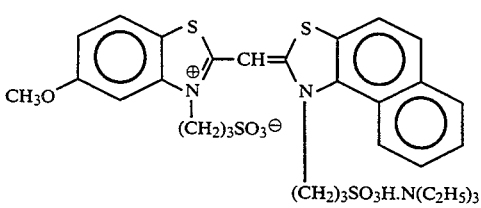
S-6
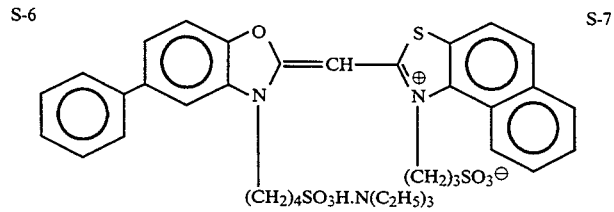
S-7
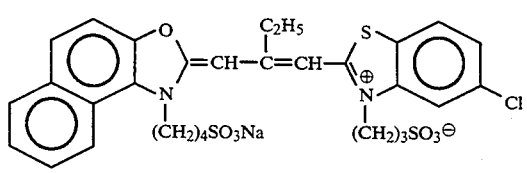
S-8
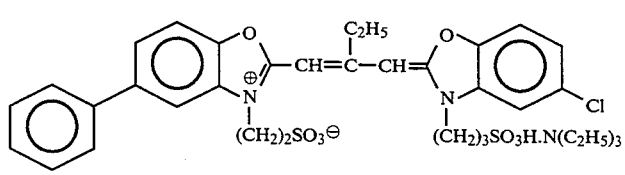
S-9

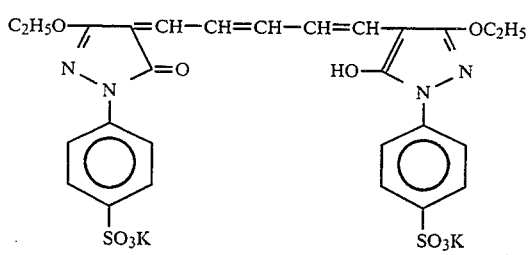
D-1
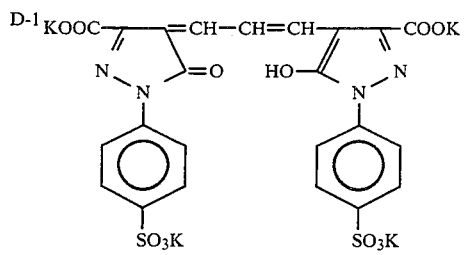
D-2
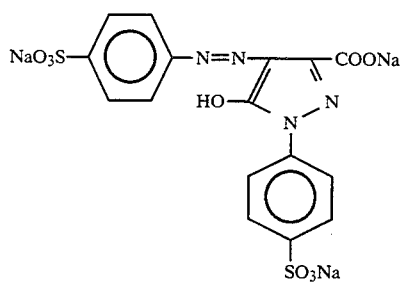
D-3
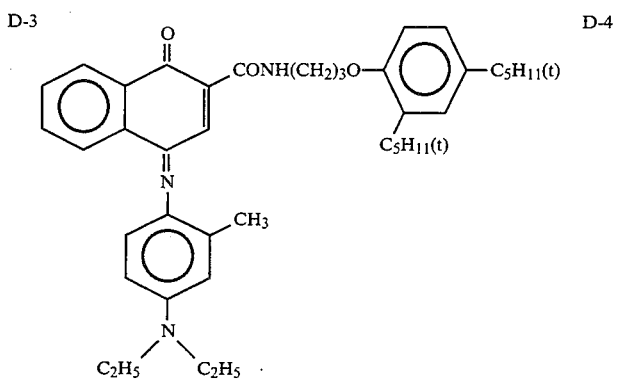
D-4
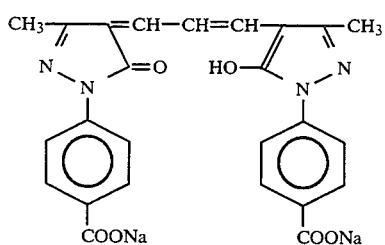
D-5
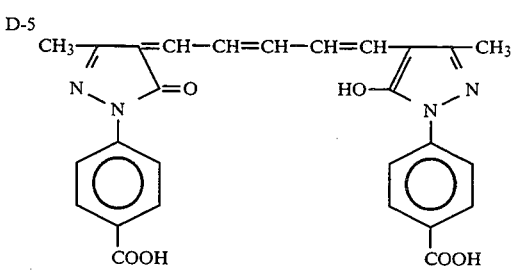
E-1
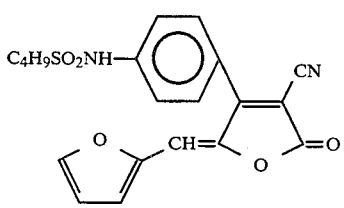
E-2 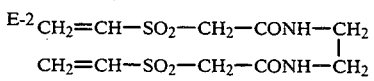
H-1
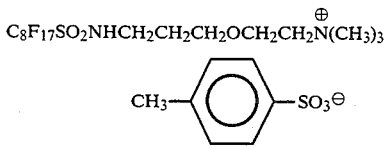
W-1 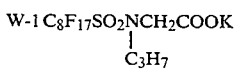
W-2
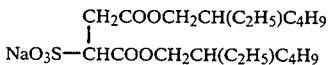
W-3 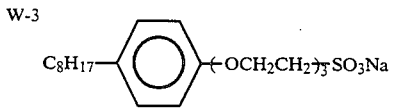
W-4
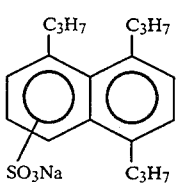
W-5 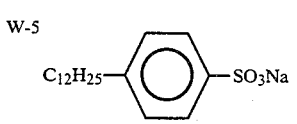
W-6
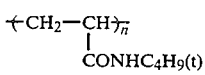
P-1 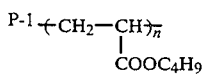
M-1

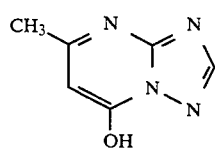

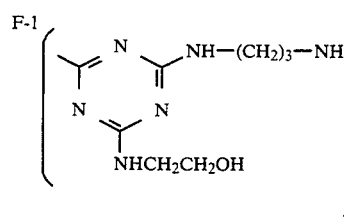

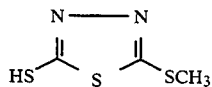

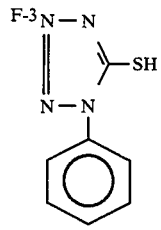

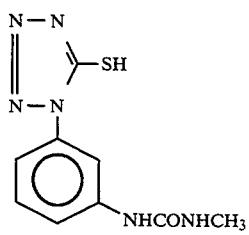

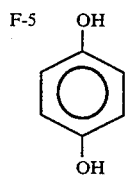

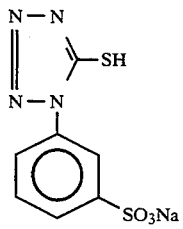

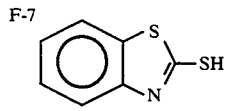

(3) Processing of the sample

The sample was cut into a film of 24 photographing sheets having a width of 35 mm. The development of the sample was carried out with a Fuji Photo Film color reversal processing CR-56 treatment available from Fuji Photo Film Co., Ltd.

Next, the evaluation of these samples will be described.

1) Measurement of an optical transparency

The optical densities (transmitting density) were measured with a X-RITE 310 TR densitometer manufactured by X-RITE Co. in a status A mode through the filters B (blue), G (green) and R (red), respectively, and the differences between the optical densities of the sample and the optical densities of a reference sample are represented by $D^B$, $D^G$, and $D^R$. The maximum one of which is defined as Dmax.

2) Evaluation of a magnetic recording performance (S/N ratio)

A signal with the recording density of 1000 bpi was recorded on each photographing sheet sample with a head having a track width of 1.5 mm, a head gap of 7 μm and a turn number of 1000, the head being capable of an input/output at the feed speed of 100 mm/s. Thereafter, the ratio of output S to noise N obtained when the signal was reproduced with the same head at the same speed was measured. The values shown in the attached Table 4 are the values obtained by setting the S/N ratio in a magnetic recording layer obtained in the comparative example at 0 dB.

The temperature and humidity during the evaluation were 25° C. and 60% RH, respectively.

3) Saturated magnetic flux density (Bm) and squareness ratio (SQ) (orientation degree)

The magnetic characteristics at a magnetic field strength (H m) of 5 kOe were measured with a vibrating sample magnetometer (VSM) manufactured by Toei Kogyo Co., Ltd.

4) Measurement of graininess

A microdensito measurement was carried out with specular light as a light source at an aperture size of 80 μm to obtain the RMS value thereof.

The samples prepared in Example 1 were subjected to the above evaluation, and the results are shown in Table 4.

COMPARATIVE EXAMPLE 1

The same procedure as that of Example 1 was repeated, except that a magnetic field orientation treatment was not carried out in preparing a base, whereby the light-sensitive material provided with a magnetic recording layer was obtained.

TABLE 4

| Sample | Residual solvent at magnetic field-applied position (%) | S/N (dB) | Optical transparency (Dmax) | Bm (emu/cm$^2$) | SQ | RMS |
| --- | --- | --- | --- | --- | --- | --- |
| A (Inv.) | 10 | 1.2 | 0.10 | 4.5 | 0.70 | 0.0022 |
| B (Inv.) | 25 | 1.8 | 0.10 | 4.5 | 0.75 | 0.0020 |
| C (Inv.) | 50 | 2.4 | 0.10 | 4.5 | 0.80 | 0.0018 |
| D (Inv.) | 70 | 3.0 | 0.10 | 4.5 | 0.85 | 0.0015 |
| E (Inv.) | 95 | 2.3 | 0.10 | 4.5 | 0.80 | 0.0028 |
| F (Comp.) | No magnetic field applied | 0 | 0.10 | 4.5 | 0.62 | 0.0030 |

As can be found from the results summarized in Table 4, the magnetic recording layer of the present invention not only has a higher S/N ratio than that having a lower orientation degree in a magnetic substance at the same optical density but also has improved graininess. The effects thereof are notable.

Example 2

A base was provided with the light-sensitive layers and subjected to sample processing and evaluation in the same manner as in Example 1, except that the base was prepared in the manner shown below.

The same subbing solution as in Example 1 was coated on a polyethylene terephthalate base (100 μm thickness) which was subjected in advance to a UV ray irradiation treatment, and dried. Then, the magnetic paint coating solution prepared in Example 1 was coated thereon and dried. The coated amount was controlled so that Dmax of a magnetic recording layer obtained became 0.10. The base thus obtained had a thickness of about 1 μm. A magnetic field orientation treatment was carried out at the coating and drying stage. The magnetic field orientation treatment was carried out using a magnet having a magnetic force of 3000 gauss immediately after coating. Two magnets having the same pole and the same magnetic force were positioned so that the base was located therebetween with a distance of each magnet to the base of 5 mm. The side having thereon the magnetic recording layer was a back face.

COMPARATIVE EXAMPLE 2

The light-sensitive material provided with a magnetic recording layer was obtained in the same manner as that in Example 2, except that a magnetic field orientation treatment was not carried out in preparing the base.

The obtained results are shown in Table 5.

TABLE 5

| Sample | S/N (dB) | Optical transparency (Dmax) | Bm (emu/cm$^2$) | SQ | RMS |
| --- | --- | --- | --- | --- | --- |
| A' (Inv.) | 3.0 | 0.10 | 4.5 | 0.85 | 0.0020 |
| B' (Comp.) | 0 | 0.10 | 4.5 | 0.62 | 0.0030 |

Example 3

A base was provided with the light-sensitive layers and subjected to sample processing and evaluation in the same manner as in Example 1, except that a magnetic paint and the base were prepared in the manner shown below.

A. Preparation of magnetic substance dispersing solution

The magnetic paint component of the following Composition 4 was put in an open kneader and kneaded for 1 hour. Then, a solvent and a binder were added to prepare the magnetic paint of Composition 5, and this was dispersed with an annular type mill. Subsequently, the binder and the solvent were added so that Composition 6 resulted, whereby the coating solution was prepared.

| | |
| --- | --- |
| Composition 4: | |
| Co-containing acicular magnetite fine powder (SBET: 48.0 g/m$^2$, Hc: 750 Oe, σs: 80 emu/g) | 1000 weight parts |
| Gelatin | 30 weight parts |
| Water | 150 weight parts |
| Sodium dodecylbenzenesulfonate | 1 weight part |
| Composition 5: | |
| Co-containing acicular magnetite fine powder (SBET: 48.0 g/m$^2$, Hc: 750 Oe, σs: 80 emu/g) | 30 weight parts |
| Gelatin | 30 weight parts |
| Water | 150 weight parts |
| Sodium dodecylbenzenesulfonate | 1 weight part |
| Composition 6: | |
| Co-containing acicular magnetite fine powder (SBET: 48.0 g/m$^2$, Hc: 750 Oe, σs: 80 emu/g) | 1 weight part |
| Gelatin | 10 weight parts |
| Water | 150 weight parts |
| Sodium dodecylbenzenesulfonate | 1 weight part |

B. Preparation of base

The following subbing solution was coated on a polyethylene terephthalate base (85 μm) which was subjected in advance to a UV ray irradiation treatment and dried. Then, the magnetic paint coating solution prepared in A above was coated thereon and dried. The coated amount was controlled so that Dmax of a magnetic recording layer obtained became 0.05. The magnetic recording layer of the base thus obtained had the thickness of about 1 μm. A magnetic field orientation treatment was carried out at the drying stage. The magnetic field orientation treatment was carried out by locating a solenoid magnet having the magnetic force of 2000 gauss at the positions having the different residual solvent contents shown in Table 6 below. The side having thereon the magnetic recording layer was a back face.

COMPARATIVE EXAMPLE 3

| | |
| --- | --- |
| Subbing solution: | |
| SnO$_2$/Sb$_2$O$_3$/SiO$_2$ (90/10/0.5, average particle size: 0.15 μm) | 0.18 mg/m$^2$ |
| Diacetyl cellulose | 0.32 g/m$^2$ |
| Aerosil | 0.02 g/m$^2$ |
| Polymethyl methacrylate | 0.32 g/m$^2$ |
| Poly(methyl methacrylate/divinylstyrene) (mole ratio 95:5, average particle size: 0.2 μm) | 0.01 g/m$^2$ |

-continued

Subbing solution:

Dimethyl silicon 0.01 g/m²

The same procedure as that of Example 3 was repeated, except that a magnetic field orientation treatment was not carried out in preparing a base, whereby the light-sensitive material provided with a magnetic recording layer was obtained.

TABLE 6

| Sample | Magnetic field-applied position | | S/N (dB) | Optical transparency (Dmax) | Bm (emu/cm²) | SQ | RMS |
|---|---|---|---|---|---|---|---|
| | Residual solvent* (%) | Residual solvent** (%) | | | | | |
| G (Inv.) | 5 | 0 | 1.3 | 0.10 | 5.0 | 0.70 | 0.0025 |
| H (Inv.) | 10 | 0 | 1.5 | 0.10 | 5.0 | 0.73 | 0.0022 |
| I (Inv.) | 25 | 3 | 2.5 | 0.10 | 5.0 | 0.80 | 0.0020 |
| J (Inv.) | 50 | 2 | 3.5 | 0.10 | 5.0 | 0.90 | 0.0015 |
| K (Inv.) | 50 | 7 | 3.5 | 0.10 | 5.0 | 0.90 | 0.0016 |
| L (Inv.) | 70 | 0 | 3.8 | 0.10 | 5.0 | 0.95 | 0.0017 |
| M (Inv.) | 70 | 15 | 3.9 | 0.10 | 5.0 | 0.95 | 0.0015 |
| N (Inv.) | 95 | 3 | 2.7 | 0.10 | 5.0 | 0.85 | 0.0030 |
| O (Inv.) | 95 | 20 | 2.5 | 0.10 | 5.0 | 0.83 | 0.0030 |
| P (Comp.) | No magnetic field applied | | 0 | 0.10 | 5.0 | 0.62 | 0.0035 |

*Residual solvent at the position where the sample starts passing through.
**Residual solvent at the position where the sample finishes passing through.

As can be found from the results summarized in Table 6 above, the magnetic recording layer of the present invention not only has a higher S/N ratio than that having a lower orientation degree in a magnetic substance at the same optical density, but also has an improved graininess. The effects thereof are notable.

Example 4

A base was provided with the light-sensitive layers and subjected to sample processing and evaluation in the same manner as in Example 3, except that a base was prepared in the manner shown below.

Preparation of the base

The same subbing solution as in Example 3 was coated on a polyethylene terephthalate base (90 μm thickness) which was subjected in advance to a UV ray irradiation treatment, and dried. Then, the magnetic substance dispersing solution prepared in above Example 3 was coated thereon and dried. The coated amount was controlled so that Dmax of a magnetic recording layer obtained became 0.05. The base thus obtained had the thickness of about 1 μm. A magnetic field orientation treatment was carried out in the same manner as in Example 3. The side having thereon the magnetic recording layer was a back face.

COMPARATIVE EXAMPLE 4

The same procedure as that of Example 4 was repeated except that a magnetic field orientation treatment was not carried out in preparing the base, whereby a light-sensitive material provided with a magnetic recording layer was obtained.

TABLE 7

| Sample | S/N (dB) | Optical transparency (Dmax) | Bm (emu/cm²) | SQ | RMS |
|---|---|---|---|---|---|
| C' (Inv.) | 3.5 | 0.10 | 5.0 | 0.90 | 0.0022 |
| D' (Comp.) | 0 | 0.10 | 5.0 | 0.62 | 0.0035 |

As can be seen from the results summarized in Table 7, the magnetic recording layer of the present invention not only has a higher S/N ratio than that having a lower orientation degree in a magnetic substance at the same optical density, but also has an improved graininess. The effects thereof are notable.

While the invention has been described in detailed with reference to specific embodiments, it will be apparent to one skilled in the art that various changes and modifications can be made to the invention without departing from its spirit and scope.

What is claimed is:

1. A process for manufacturing a silver halide photographic material including a support, a silver halide emulsion layer on at least one side of the support, and at least one optically transparent magnetic recording layer, comprising the steps of a) applying a coating solution having a magnetic substance dispersed therein onto the support, to form a magnetic recording layer, and b) drying the support while passing the support through an orienting magnetic field to orient the magnetic substance contained in the coating solution in a fixed direction, the orientation of the magnetic substance commencing while the magnetic recording layer contains between 5% to 70% residual solvent.

2. The process for manufacturing a silver halide photographic material of claim 1, wherein the magnetic substance is selected from the group consisting of ferromagnetic γ-iron oxide fine powder, Co-containing ferromagnetic γ-iron oxide fine powder, ferromagnetic magnetite fine powder, Co-containing ferromagnetic magnetite fine powder, ferromagnetic chromium dioxide fine powder, ferromagnetic alloy powder and barium ferrite powder.

3. The process for manufacturing a silver halide photographic material of claim 1, wherein the magnetic substance is of a needle form or a rice form.

4. The process for manufacturing a silver halide photographic material of claim 1, wherein step (b) comprises passing the support through an orienting magnetic field until the magnetic substance has an orientation degree of at least 0.75.

5. The process for manufacturing a silver halide photographic material of claim 1, wherein step (a) comprises applying the magnetic substance in an amount of 0.01 to 1 g/m² of the magnetic recording layer.

6. The process for manufacturing a silver halide photographic material of claim 1, wherein step (a) comprises applying the coating solution in an amount to form the magnetic recording layer in a thickness of 0.1 to 10 μm.

7. A silver halide photographic material comprising a support, a silver halide emulsion layer on at least one side of the support, and at least one magnetic recording layer comprising a magnetic substance, the magnetic recording layer having a maximum optical density up to 0.3, and the magnetic substance having an orientation degree of at least 0.75, the photographic material being prepared by the steps of a) applying a coating solution having a magnetic substance dispersed therein onto the support to form a magnetic recording layer, and b) drying the support while passing the support through an orienting magnetic field to orient the magnetic substance contained in the coating solution in a fixed direction, the orientation of the magnetic substance commencing while the magnetic recording layer contains between 5% to 70% residual solvent.

8. The silver halide photographic material of claim 7, wherein the maximum optical density of the magnetic recording layer is up to 0.1.

9. The silver halide photographic material of claim 7, wherein the maximum optical density of the magnetic recording layer is between 0.001 and 0.05.

10. The silver halide photographic material of claim 7, wherein the magnetic recording layer comprises a magnetic substance selected from the group consisting of ferromagnetic γ-iron oxide fine powder, Co-containing ferromagnetic γ-iron oxide fine powder, ferromagnetic magnetite fine powder, Co-containing ferromagnetic magnetite fine powder, ferromagnetic chromium dioxide fine powder, ferromagnetic alloy powder and barium ferrite powder.

11. The silver halide photographic material of claim 7, wherein the support comprises at least one material selected from the group consisting of triacethylcellulose, polyethylene terephthalate and polyethylene naphthalate.

12. The silver halide photographic material of claim 7, wherein the magnetic substance has an orientation degree of at least 0.80.

13. The silver halide photographic material of claim 7, wherein the magnetic recording layer has a thickness of 0.1 to 10 μm.

* * * * *